United States Patent
Arima et al.

(10) Patent No.: US 12,517,288 B2
(45) Date of Patent: Jan. 6, 2026

(54) DIFFUSION PLATE, DISPLAY DEVICE, PROJECTION DEVICE, LIGHTING DEVICE, AND REMOTE SENSING LIGHT SOURCE

(71) Applicant: DEXERIALS CORPORATION, Tochigi (JP)

(72) Inventors: Mitsuo Arima, Tochigi (JP); Masayuki Ishiwata, Tochigi (JP); Kazuhiko Noda, Tochigi (JP); Shunsuke Kanasugi, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 333 days.

(21) Appl. No.: 18/030,914

(22) PCT Filed: Dec. 14, 2021

(86) PCT No.: PCT/JP2021/046053
§ 371 (c)(1),
(2) Date: Apr. 7, 2023

(87) PCT Pub. No.: WO2022/131251
PCT Pub. Date: Jun. 23, 2022

(65) Prior Publication Data
US 2023/0384490 A1   Nov. 30, 2023

(30) Foreign Application Priority Data
Dec. 18, 2020 (JP) .................................. 2020-210096

(51) Int. Cl.
*G02B 5/02* (2006.01)

(52) U.S. Cl.
CPC ......... *G02B 5/0215* (2013.01); *G02B 5/0278* (2013.01)

(58) Field of Classification Search
CPC ...... G02B 5/0215; G02B 5/0278; G02B 3/00; G02B 3/0043; G02B 3/0056; G02B 3/06;
(Continued)

(56) References Cited

U.S. PATENT DOCUMENTS

| | | | |
|---|---|---|---|
| 2009/0296024 A1 | 12/2009 | Kanaya et al. | |
| 2011/0019128 A1* | 1/2011 | Takata | G02F 1/133606 359/619 |
| 2020/0386919 A1* | 12/2020 | Arima | G02B 5/0221 |

FOREIGN PATENT DOCUMENTS

| | | |
|---|---|---|
| CN | 103903519 A | 7/2014 |
| JP | 2007-334257 A | 12/2007 |

(Continued)

OTHER PUBLICATIONS

Apr. 1, 2025, Japanese Office Action issued for related JP Application No. 2020-210096.
Oct. 8, 2024, Japanese Office Action issued for related JP Application No. 2020-210096.
Feb. 17, 2025, Taiwanese Office Action issued for related TW Application No. 110147540.
(Continued)

*Primary Examiner* — Charles S Chang
(74) *Attorney, Agent, or Firm* — Paratus Law Group, PLLC

(57) ABSTRACT

Spectral noise produced by a diffraction phenomenon of a periodic structure can be reduced to improve homogeneity of intensity of straight diffusion light, and noise of zero-order diffraction light is reduced to improve light distribution properties as well. A diffusion plate 1 of a microlens array type that emits straight diffusion light includes a base material 10, and a plurality of cylindrical lenses 21 arranged in an X direction on an X-Y plane of the base material 10 and composed of elongated convex portions or elongated concave portions extending in a Y direction. An aperture width D and a radius of curvature R in the X direction of each of the cylindrical lenses 21 are randomly varied within variation ranges defined by variation full width rates $\delta D$ and $\delta R$, respectively, using a reference aperture width Dk and a (Continued)

reference radius of curvature Rk as references, and an off-center amount Ec of each of the cylindrical lenses 21 is randomly vaned within a variation range defined by a variation full width rate δEc, where δD, δR, and δEc satisfy Expression (1), and at least either δD or δR is not 0%.

10 Claims, 33 Drawing Sheets

(58) Field of Classification Search
CPC ..... G02B 5/02; G02B 5/0221; F21Y 2115/10; F21Y 2115/30; F21V 3/00; F21V 5/00; F21V 5/02; F21V 5/04; G03B 21/00; G09F 9/00
See application file for complete search history.

(56) References Cited

FOREIGN PATENT DOCUMENTS

| | | |
|---|---|---|
| JP | 2011-059667 A | 3/2011 |
| JP | 2015-169804 A | 9/2015 |
| JP | 2017-068216 A | 4/2017 |
| TW | 201116858 A1 | 5/2011 |
| WO | WO 2009/090828 A1 | 7/2009 |
| WO | WO 2015/182619 A1 | 12/2015 |
| WO | WO 2016/051785 A1 | 4/2016 |

OTHER PUBLICATIONS

Oct. 7, 2025, Japanese Office Action issued for related JP Application No. 2020-210096.

* cited by examiner

DIFFUSION PLATE, DISPLAY DEVICE, PROJECTION DEVICE, LIGHTING DEVICE, AND REMOTE SENSING LIGHT SOURCE

CROSS REFERENCE TO PRIOR APPLICATION

This application is a National Stage Patent Application of PCT International Patent Application No. PCT/JP2021/046053 (filed on Dec. 14, 2021) under 35 U.S.C. § 371, which claims priority to Japanese Patent Application No. 2020-210096 (filed on Dec. 18, 2020), which are all hereby incorporated by reference in their entirety.

TECHNICAL FIELD

The present invention relates to a diffusion plate, a display device, a projection device, a lighting device, and a remote sensing light source.

BACKGROUND ART

A diffusion plate that diffuses incoming light to a desired direction is used for changing light diffusion properties. The diffusion plate is widely utilized in various devices, for example, a display device such as a display, a projection device such as a projector, and various lighting devices. There is a diffusion plate of a type that utilizes light refraction resulting from a surface shape of the diffusion plate to diffuse incoming light at a desired diffusion angle. As the diffusion plate of that type, a diffusion plate of a microlens array type in which a plurality of microlenses having a size of approximately several tens of micrometers are located is known.

Such a diffusion plate of a microlens array type raises a problem in that, as a result of interference of wavefronts of light from the respective microlenses, a diffraction wave due to a periodic structure of a microlens arrangement occurs, and an intensity distribution of diffusion light becomes uneven. Thus, technologies for varying the location of microlenses, the shape of a lens surface, and the shape of an aperture, thereby reducing unevenness of the intensity distribution of diffusion light due to interference or diffraction have been proposed.

For example, Patent Literature 1 describes a diffusion plate having a plurality of microlenses regularly located in a rectangular lattice shape on a principal surface, in which a plurality of microlenses having cross-sectional shapes different from one another and not having a symmetrical axis are used. Patent Literature 2 describes that lens vertex positions of a plurality of microlenses arranged in a rectangular lattice shape are located with offsets from lattice points of a reference lattice.

CITATION LIST

Patent Literature

Patent Literature 1: WO 2016/051785 A1
Patent Literature 2: WO 2015/182619 A1

SUMMARY OF INVENTION

Technical Problem

An example of the above-described diffusion plate of a microlens array type is a diffusion plate that diffuses incoming light in a straight form advancing in a specific direction to emit straight diffusion light. For such a diffusion plate, a microlens array structure in which a plurality of cylindrical lenses having the same shape are periodically arranged is common.

However, an array structure in which a plurality of cylindrical lenses having the same shape are periodically arranged in this manner raises a problem in that a diffraction phenomenon of the periodic structure produces spectral diffraction light (spectral noise), resulting in degraded homogeneity of intensity of straight diffusion light. Further, another problem lies in that zero-order diffraction light (noise) having a high intensity is produced, which makes it difficult to appropriately distribute diffusion light dispersedly in a specific direction, resulting in degraded light distribution properties of straight diffusion light in the specific direction.

The present invention was therefore made in view of the above-described circumstances, and an object of the present invention is to provide a diffusion plate of a microlens array type that emits straight diffusion light, in which spectral noise produced by a diffraction phenomenon of a periodic structure can be reduced to improve homogeneity of intensity of straight diffusion light and noise of zero-order diffraction light is reduced to improve light distribution properties as well.

Solution to Problem

In order to solve the above-described problems, according to an aspect of the present invention, there is provided a diffusion plate of a microlens array type that emits straight diffusion light, including:
  a base material; and
  a plurality of cylindrical lenses arranged in an X direction on an X-Y plane on at least one of surfaces of the base material, and composed of elongated convex portions or elongated concave portions extending in a Y direction vertical to the X direction, in which
  an aperture width D [μm] in the X direction of each of the cylindrical lenses is randomly varied within a variation range defined by a variation full width rate δD [%] using a reference aperture width Dk [μm] as a reference,
  a radius of curvature R [μm] of each of the cylindrical lenses is randomly varied within a variation range defined by a variation full width rate δR [%] using a reference radius of curvature Rk [μm] as a reference,
  an off-center amount Ec [μm] of each of the cylindrical lenses is randomly varied within a variation range defined by a variation full width rate δEc [%], and
  the δD [%], the δR [%], and the δEc [%] satisfy Expression (1) below, and at least either the δD [%] or the δR [%] is not 0 [%]:

[Math. 1]
  $$\sqrt{(\delta D)^2 + (\delta R)^2 + (\delta Ec)^2} \geq 9 \qquad (1)$$

where
    the variation full width rate δD [%] is a ratio of a variation full width ΔD [μm] to the reference aperture width Dk [μm] (δD=ΔD/Dk×100),
    the variation full width ΔD [μm] is a difference between an upper limit value $dD_{MAX}$ and a lower limit value $dD_{MIN}$ of a variation amount dD of the aperture width D (ΔD=$dD_{MAX}$−$dD_{MIN}$),
    the variation full width rate δR [%] is a ratio of a variation full width ΔR to the reference radius of curvature Rk (δR=ΔR/Rk×100), the variation full width ΔR [μm] is a difference between an upper limit value $dR_{MAX}$ and a lower limit value $dR_{MIN}$ of a variation amount dR of the radius of curvature R ($\Delta R = dR_{MAX} - dR_{MIN}$), the off-center amount Ec is an offset amount in the X direction of a position of a vertex of each of the cylindrical lenses relative to a central position in the X direction of each of the cylindrical lenses, the variation full width rate δEc [%] is a ratio of a variation full width ΔEc to the reference aperture width Dk ($\delta Ec = \Delta Ec/Dk \times 100$), and the variation full width ΔEc [μm] is a difference between an upper limit value $Ec_{MAX}$ and a lower limit value $Ec_{MIN}$ of the off-center amount Ec ($\Delta Ec = Ec_{MAX} - Ec_{MIN}$).

The δD [%], the δR [%], and the δEc [%] may satisfy Expression (2) below:

[Math. 2]

$$(\delta D)^2 + (\delta R)^2 + (\delta Ec)^2 \geq 14 \tag{2}$$

The δD [%], the δR [%], and the δEc [%] may satisfy Expression (3) below:

[Math. 3]

$$\sqrt{(\delta D)^2 + (\delta R)^2 + (\delta Ec)^2} < 46.9 \tag{3}$$

The δD may be more than or equal to 7% and less than 30%.

The δR may be more than or equal to 7% and less than 30%.

The δEc may be more than or equal to 7% and less than or equal to 30%.

In order to solve the above-described problems, according to another aspect of the present invention, there is provided a display device including the above-described diffusion plate.

In order to solve the above-described problems, according to another aspect of the present invention, there is provided a projection device including the above-described diffusion plate.

In order to solve the above-described problems, according to another aspect of the present invention, there is provided a lighting device including the above-described diffusion plate.

In order to solve the above-described problems, according to another aspect of the present invention, there is provided a remote sensing light source including the above-described diffusion plate.

Advantageous Effects of Invention

As described above, according to the present invention, in a diffusion plate of a microlens array type that emits straight diffusion light, spectral noise produced by the diffraction phenomenon of the periodic structure can be reduced to improve homogeneity of intensity of straight diffusion light, and noise of zero-order diffraction light can be reduced to improve light distribution properties as well.

DESCRIPTION OF EMBODIMENTS

Figure 1:
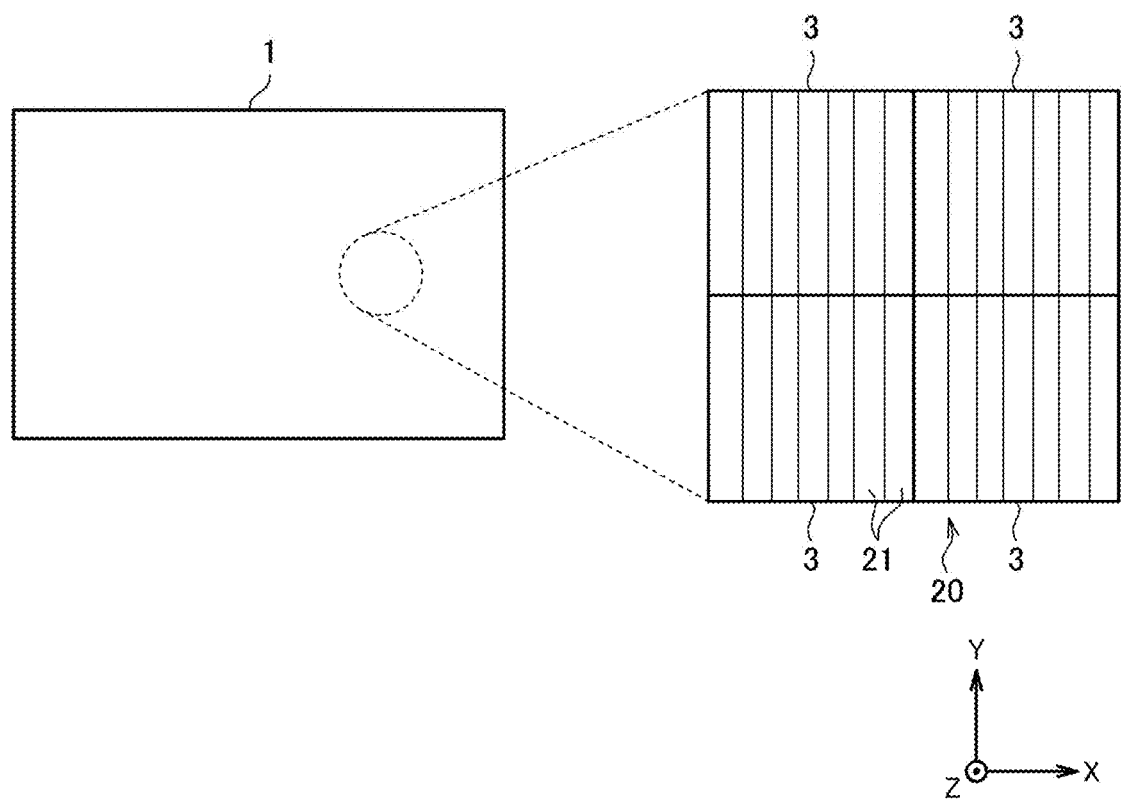
FIG. 1 shows explanatory diagrams schematically showing a diffusion plate according to an embodiment of the present invention.

Hereinafter, a preferred embodiment(s) of the present invention will be described in detail with reference to the appended drawings. Note that, in this specification and the drawings, constitutional elements that have substantially the same function and configuration are denoted with the same reference numerals, thereby omitting repeated explanation.

1. Overview of Diffusion Plate

First, an overview of a diffusion plate according to an embodiment of the present invention will be described.

The diffusion plate according to the present embodiment which will be described below in detail is a diffusion plate of a microlens array type having a function of homogeneously diffusing light. The diffusion plate has a base material, and a microlens array formed on an X-Y plane on at least one (a principal surface) of surfaces of the base material. The microlens array is composed of a plurality of microlenses arranged and deployed on the X-Y plane. The microlenses according to the present embodiment are composed of cylindrical lenses having a generally cylindrical shape. The cylindrical lenses are composed of elongated convex portions (convex lenses) or elongated concave portions (concave lenses) extending in a Y direction vertical to an X direction, and have an aperture width D in the X direction of approximately several tens of micrometers, for example. The cylindrical lenses have lens surfaces having a generally semi-cylindrical shape, for example. The plurality of cylindrical lenses are periodically arranged in the X direction on the X-Y plane, so that the microlens array is configured.

In the diffusion plate according to the present embodiment, the aperture width D in the X direction (equivalent to a pitch (cycle) or a lens diameter in the X direction) of the plurality of cylindrical lenses arranged in the X direction is randomly (irregularly) varied to be different from one another. Further, a radius of curvature R in the X direction of the plurality of cylindrical lenses is randomly (irregularly) varied to be different from one another. In addition, a planar position in the X direction of the vertex of each microlens is off-centered with an offset from the central position in the X direction of each microlens. At this time, an off-center amount Ec of the plurality of cylindrical lenses is randomly (irregularly) varied to be different from one another. In addition, a height position in a Z direction of the vertex of the plurality of cylindrical lenses (a position in a thickness direction of the diffusion plate) is also randomly (irregularly) varied to be different from one another.

In this manner, the aperture width D, the radius of curvature R, the off-center amount Ec, and the like of each of the cylindrical lenses are randomly varied in the present embodiment. This causes the surface shape of each of the cylindrical lenses to be randomly varied, so that the plurality of cylindrical lenses have surface shapes different from one another. Further, the aperture width D, the radius of curvature R, and the off-center amount Ec of each of the cylindrical lenses are randomly varied within variation ranges defined by predetermined variation full width rates δD, δR, and δEc [%], respectively. Further, the variation full width rates δD, δR, and δEc [%] are set to satisfy a predetermined relational expression. Note that details of the variation full width rates δD, δR, and δEc [%] as well as their relational expression will be described later.

As described above, the diffusion plate according to the present embodiment achieves a highly-random three-dimensional surface structure of the microlens array by randomly varying the respective variation elements of the plurality of microlenses (cylindrical lenses). In addition, by setting to satisfy the relational expression in which the variation full width rates δD, δR, and δEc are used as parameters, variation amounts of the aperture width D, the radius of curvature R, and the off-center amount Ec are also adjusted to fall within suitable variation ranges. Accordingly, zero-order diffraction light (noise) in uniaxial linear diffusion light emitted from the diffusion plate can be reduced to improve the light distribution properties in the X direction, and spectral noise resulting from the periodic structure of the microlens array can be reduced to improve homogeneity of intensity of the diffusion light as well. Note that the spectral noise is noise caused by periodic peak-like diffraction light produced by the diffraction phenomenon resulting from the periodic structure of the microlens array.

Thus, the present embodiment can suitably control an overlapping state of phases of light emanating from the respective microlenses (cylindrical lenses). As a result, noise of zero-order diffraction light is suppressed while satisfying homogeneity of light distribution in the X direction of uniaxial linear diffusion light, so that excellent light distribution properties, anisotropy of light distribution in the X direction, and cutoff properties of intensity distribution of diffusion light can be achieved. Hereinafter, the diffusion plate having characteristics as described above will be described in detail.

2. Overall Configuration of Diffusion Plate

First, an overall configuration of a diffusion plate 1 according to an embodiment of the present invention and a layout pattern of microlenses will be described with reference to FIG. 1. FIG. 1 shows explanatory diagrams schematically showing the diffusion plate 1 according to the present embodiment.

The diffusion plate 1 according to the present embodiment is a diffusion plate of a microlens array type, and includes a microlens array 20 composed of a plurality of microlenses (cylindrical lenses 21) arranged on a substrate. The microlens array 20 of the diffusion plate 1 is composed of a plurality of unit cells 3 as shown in FIG. 1. The unit cell 3 is a basic locating pattern of microlenses. A plurality of microlenses (the cylindrical lenses 21) are located in a predetermined layout pattern (locating pattern) on a surface of each of the unit cells 3.

Herein, FIG. 1 shows an example in which the unit cells 3 constituting the diffusion plate 1 have a rectangular shape, particularly, a square shape. However, the shape of the unit cells 3 is not limited to the example shown in FIG. 1, and may be any shape that can fill the surface of the diffusion plate 1 (the X-Y plane) without any gaps, such as an equilateral triangular shape or a regular hexagonal shape, for example.

In the example of FIG. 1, the plurality of square unit cells 3 are repeatedly arranged on the surface of the diffusion plate 1 vertically and horizontally (in the X and Y directions). The number of the unit cells 3 constituting the diffusion plate 1 according to the present embodiment is not particularly limited. The diffusion plate 1 may be composed of a single unit cell 3, or may be composed of a plurality of unit cells 3. In addition, in the diffusion plate 1 according to the present embodiment, the unit cells 3 having surface structures different from one another may be repeatedly located, or the unit cells 3 having a surface structure identical to one another may be repeatedly located.

In addition, between the unit cells 3, 3, the layout pattern (locating pattern) of the plurality of microlenses (the cylindrical lenses 21) provided in the unit cells 3 is continuous in the arrangement direction (that is, an array arrangement direction) of the unit cells 3 as schematically shown in a magnified view on the right side in FIG. 1. The microlens array 20 is configured by arranging the unit cells 3 without any gaps while maintaining continuity of the microlenses in boundary portions between the plurality of unit cells 3, 3. Herein, the continuity of the microlenses means that a microlens located at an outer edge of one of mutually adjacent two of the unit cells 3 and a microlens located at an outer edge of the other unit cell 3 are continuously connected without any offset in the planar shape or any level difference in the height direction.

In this manner, in the diffusion plate 1 according to the present embodiment, the microlens array 20 is configured by arranging the unit cells 3 (basic structures) of the microlens array 20 without any gaps while maintaining the continuity at the boundaries. This can prevent an unintended failure such as diffraction, reflection, or scattering of light from occurring in the boundary portions between the unit cells 3, 3, thereby obtaining desired light distribution properties by the diffusion plate 1.

3. Configuration of Diffusion Plate

Figure 2:
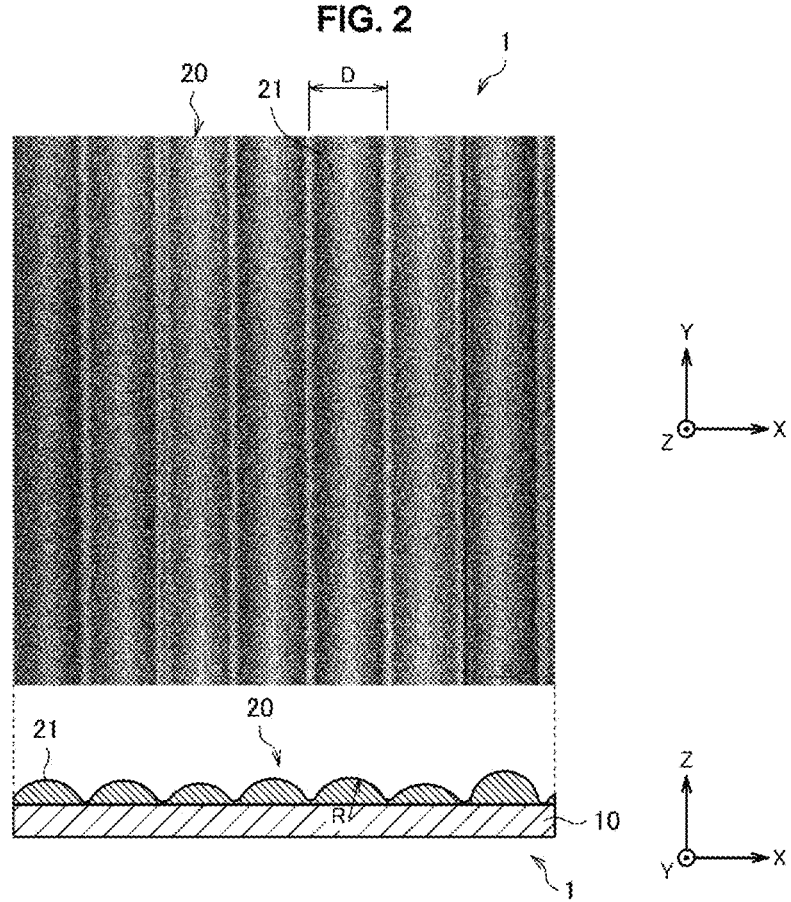
FIG. 2 shows a magnified plan view and a magnified cross-sectional view schematically showing the diffusion plate according to the embodiment.
Figure 3:
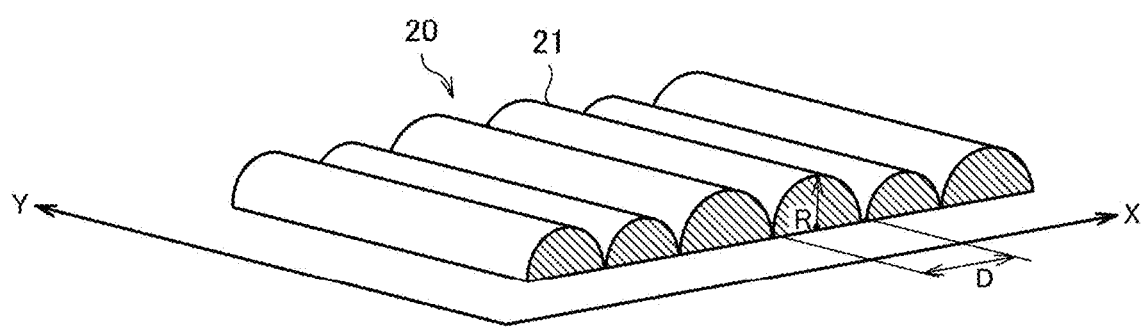
FIG. 3 is a perspective view schematically showing a microlens array of the diffusion plate according to the embodiment.
Figure 4:
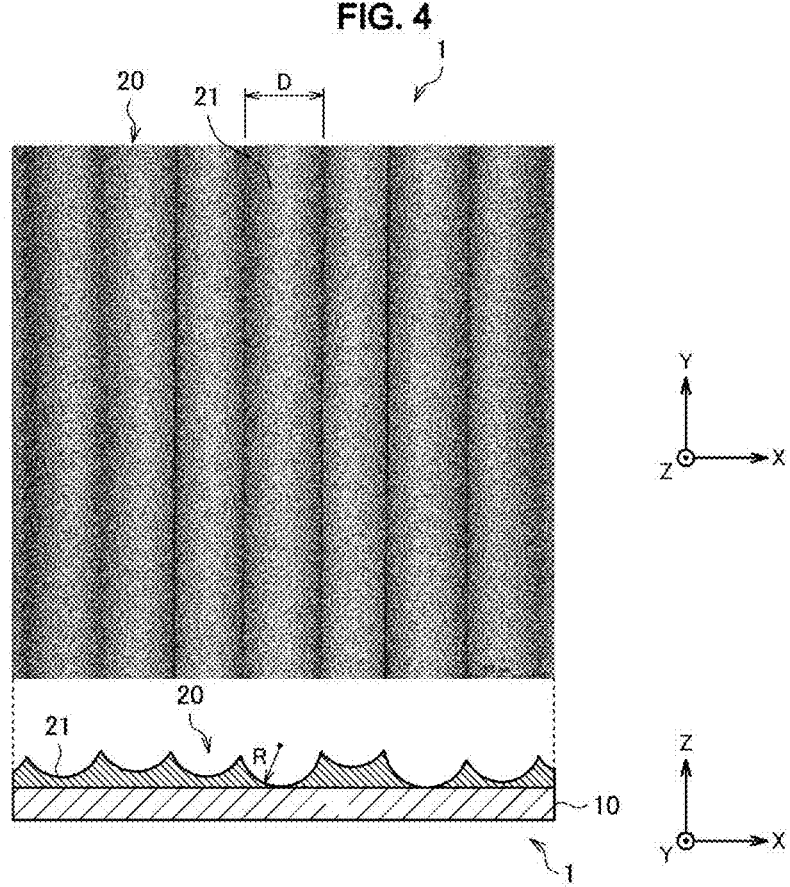
FIG. 4 shows a magnified plan view and a magnified cross-sectional view schematically showing a diffusion plate according to a modification of the embodiment.
Figure 5:
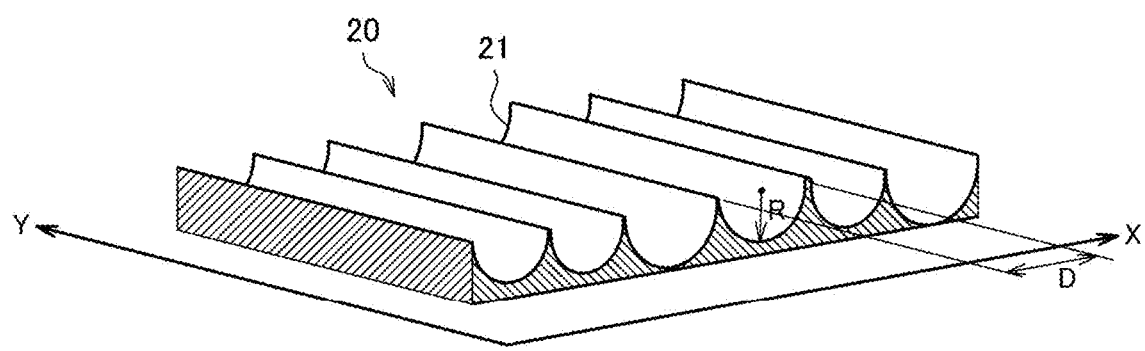
FIG. 5 is a perspective view schematically showing a microlens array of the diffusion plate according to the modification of the embodiment.

Next, the configuration of the diffusion plate 1 according to the present embodiment will be described in more detail with reference to FIG. 2 to FIG. 5. FIG. 2 shows a magnified plan view and a magnified cross-sectional view schematically showing the diffusion plate 1 according to the present embodiment. FIG. 3 is a perspective view schematically showing the microlens array 20 of the diffusion plate 1 according to the present embodiment. FIG. 4 shows a magnified plan view and a magnified cross-sectional view schematically showing the diffusion plate 1 according to a modification of the present embodiment. FIG. 5 is a perspective view schematically showing the microlens array 20 of the diffusion plate 1 according to the modification of the present embodiment.

As shown in FIG. 2 to FIG. 5, the diffusion plate 1 according to the present embodiment includes a base material 10 and the microlens array 20 formed on a surface of the base material 10.

First, the base material 10 will be described. The base material 10 is a substrate for supporting the microlens array 20. The base material 10 may have a film shape, or may have a plate shape. The base material 10 shown in FIG. 2 and FIG. 4 has a rectangular planar shape, for example, but is not limited to this example. The shape and thickness of the base material 10 may be any shape and thickness depending on the shape of a device in which the diffusion plate 1 is to be mounted.

The base material 10 is a transparent base material that can transmit light, and has translucency. The base material 10 is formed of a material that can be regarded as being transparent in a wavelength band of light incident on the diffusion plate 1. For example, the base material 10 may be formed of a material having a light transmittance of more than or equal to 70% in a wavelength band corresponding to visible light.

The base material 10 may be formed of publicly known resin such as, for example, polymethyl methacrylate (PMMA), polyethylene terephthalate (PET), polycarbonate (PC), cyclo olefin copolymer (COC), cyclo olefin polymer (COP), or triacetylcellulose (TAC). Alternatively, the base material 10 may be formed of a publicly known optical glass such as quartz glass, borosilicate glass, or high transmission crown glass.

Next, the microlens array 20 will be described. The microlens array 20 is provided on at least one (a principal surface) of surfaces of the base material 10. The microlens array 20 is a group of a plurality of microlenses (single lenses) arranged on the surface of the base material 10. In the present embodiment, the microlens array 20 is formed on one of the surfaces of the base material 10 as shown in FIG. 2. However, this is not a limitative example, and the microlens arrays 20 may be formed on both principal surfaces (front and rear surfaces) of the base material 10.

A microlens is a minute optical lens on the order of several tens of micrometers, for example. The microlens constitutes a single lens of the microlens array 20. The microlenses according to the present embodiment are composed of the cylindrical lenses 21 as shown in FIG. 2 to FIG. 5.

The cylindrical lens 21 is an optical lens having a generally semi-cylindrical (cylindrical) lens surface. The cylindrical lens 21 has a function of converting incoming light such as laser light, for example, into linear diffusion light.

The surface shape of each of the cylindrical lenses 21 is not particularly limited if it has a curved surface shape including a curved surface component of part of a generally semi-cylindrical shape (a hog-backed curved surface component). The generally semi-cylindrical shape is a substantially semi-cylindrical shape, and includes not only a strict semi-cylindrical shape, but also a shape distorted from a semi-cylindrical shape. The surface shape of the cylindrical lens 21 may be a curved surface shape only including a cylindrical element, may be a curved surface shape including a cylindrical element and a non-cylindrical element, or may be a curved surface shape only including a non-cylindrical element, for example.

The cylindrical lens 21 may be a convex structure (convex lens) formed to protrude in the thickness direction of the diffusion plate 1 as shown in FIG. 2 and FIG. 3, or may be a concave structure (concave lens) formed to be recessed in the thickness direction of the diffusion plate 1 as shown in FIG. 4 and FIG. 5. In this manner, the cylindrical lens 21 may be either a convex structure (convex lens) or a concave structure (concave lens) depending on desired optical properties of the diffusion plate 1.

As shown in FIG. 2 and FIG. 3, the cylindrical lens 21 according to the present embodiment is a microlens composed of an elongated convex portion extending elongatedly in the Y direction and having a convex structure. When a plurality of cylindrical lenses 21 composed of elongated convex portions are arranged in the X direction, the microlens array 20 composed of the microlenses having the convex structure is configured.

On the other hand, the cylindrical lens 21 according to a modification of the present embodiment is a microlens composed of an elongated concave portion extending elongatedly in the Y direction and having a concave structure as shown in FIG. 4 and FIG. 5. When a plurality of cylindrical lenses 21 composed of elongated concave portions are arranged in the X direction, the microlens array 20 composed of microlenses having the concave structure is configured.

In either case of the convex structure or the concave structure, the aperture width D and the radius of curvature R in the X direction of each of the cylindrical lenses 21 as well as the off-center amount Ec of the lens vertex are randomly varied within predetermined variation width ranges. Accordingly, the plurality of cylindrical lenses 21 have surface shapes different from one another.

In the microlens array 20 according to the present embodiment, the aperture width D in the X direction of the plurality of cylindrical lenses 21 is randomly varied within a predetermined variation width range. Accordingly, a locating pitch in the X direction of the cylindrical lenses 21 is not constant, which means that the plurality of cylindrical lenses 21 are not regularly located at a predetermined pitch (cycle) in the X direction. However, the plurality of cylindrical lenses 21 are located to extend in the Y direction to be parallel to one another, and are located regularly to some extent (hereinafter referred to as "quasi-regularly") in the whole microlens array 20.

As shown in FIG. 2 to FIG. 5, the plurality of cylindrical lenses 21 preferably are located densely to be adjacent to one another without any gaps in the X direction. In other words, the plurality of cylindrical lenses 21 preferably are continuously located in the X direction such that there is no gap (flat portion) in the boundary portion between mutually adjacent ones of the cylindrical lenses 21, 21. When the cylindrical lenses 21 are located on the base material 10 without any gaps (that is, located such that a packing ratio of the cylindrical lenses 21 becomes 100%), a component of incoming light that is transmitted as it is without being scattered by the surface of the diffusion plate 1 (hereinafter also referred to as a "zero-order transmitted light component") can be suppressed. As a result, the location of the plurality of cylindrical lenses 21 to be adjacent to one another without any gaps enables diffusion performance of the microlens array 20 according to the present embodiment to be improved further.

Note that in order to suppress the zero-order transmitted light component, the packing ratio of the cylindrical lenses 21 on the base material 10 preferably is more than or equal to 90%, and more preferably is 100%. Herein, the packing ratio is a proportion of an area of a portion occupied by the plurality of cylindrical lenses 21 on the surface (the X-Y plane) of the base material 10. If the packing ratio is 100%, the surface of the microlens array 20 is formed of curved surface components, and hardly includes flat surface components.

However, the curved surfaces of the plurality of cylindrical lenses 21 are continuously connected in actual manufacturing of the microlens array 20, so that the vicinity of an inflection point at the boundary between adjacent ones of the cylindrical lenses 21, 21 may become generally flat. In such a case, at the boundary between the cylindrical lenses 21, 21, the width in the X direction of a region in the vicinity of the inflection point which becomes generally flat (the width in the X direction of the boundary line between the cylindrical lenses 21, 21) preferably is less than or equal to 1 μm, for example. Accordingly, the zero-order transmitted light component can be suppressed sufficiently.

In the present embodiment, the surface shapes (three-dimensional curved surface shapes) and the planar shapes (two-dimensional shapes projected on the X-Y plane of the base material 10) of the cylindrical lenses 21 are randomly varied. As shown in FIG. 2 and FIG. 4, the planar shapes of the cylindrical lenses 21 (outer shapes of the cylindrical lenses 21 projected on the X-Y plane) have a generally rectangular strip shape extending elongatedly in the Y direction as a whole. The surface shapes and planar shapes of the plurality of cylindrical lenses 21 are different from one another. The reason why the plurality of cylindrical lenses 21 have shapes different from one another in this manner is because the aperture width D, the radius of curvature R, the off-center amount Ec of the lens vertex, and the like of each of the cylindrical lenses 21 are randomly varied within the predetermined variation width ranges. Note that details of methods for varying the aperture width D, the radius of curvature R, and the off-center amount Ec of the cylindrical lenses 21 according to the present embodiment will be described later.

In this manner, in the present embodiment, the aperture width D, the radius of curvature R, and the off-center amount Ec of each of the cylindrical lenses 21 are randomly varied respectively, and have variations. The phase distribution of optical apertures of the respective cylindrical lenses 21 differs depending on the orientation. The plurality of cylindrical lenses 21 are continuously arranged in the X direction to overlap one another on the surface of the base material 10, and the radius of curvature R, the aperture width D, and the off-center amount Ec of each of the cylindrical lenses 21 are randomly varied. Accordingly, the plurality of cylindrical lenses 21 have shapes (surface shapes and planar shapes) different from one another. Consequently, the plurality of cylindrical lenses 21 have various shapes as shown in FIG. 2 to FIG. 5, and many of them have cross-sectional shapes asymmetric in the X direction. As a result, the periodic structure of the microlens array 20 is deformed, so that spectral noise resulting from the periodic structure and noise such as the zero-order diffraction light can be reduced. Thus, the diffusion plate 1 according to the present embodiment enables light distribution properties and homogeneity of linear diffusion light emitted from the microlens array 20 to be improved as compared with conventional microlens arrays.

4. Definition of Parameters

Next, definition of various parameters concerning the microlens array 20 according to the present embodiment will be described.

(A) Parameters Concerning Aperture Width (A1) Aperture Width D [μm]: Variable Value The aperture width D is an aperture width in the X direction of each of the cylindrical lenses 21 (see FIG. 2 to FIG. 5). The aperture width D is an actual aperture width randomly varied for each of the cylindrical lenses 21, and is a variable value. The aperture width D is equivalent to the lens diameter and pitch (cycle) in the X direction of the cylindrical lenses 21.

(A2) Reference Aperture Width Dk [μm]: Fixed Value

A reference aperture width Dk is an aperture width in the X direction of a reference shape of the cylindrical lenses 21. The reference aperture width Dk is a fixed value set when designing the microlens array 20. The reference aperture width Dk serves as a reference value (variation center value) when varying the aperture width D.

(A3) Variation Amount dD [μm] of Aperture Width: Variable Value

A variation amount dD of the aperture width is a difference between "the aperture width D [μm]" and "the reference aperture width Dk [μm]", where dD is a variable value that is randomly varied for each of the cylindrical lenses 21.

$$dD = D - Dk$$

(A4) Variation Rate $K_D$ [±%] of Aperture Width: Variable Value

A variation rate $K_D$ of the aperture width is a ratio (percentage) of "the variation amount dD [µm] of the aperture width" to "the reference aperture width Dk [µm]", where $K_D$ is a variable value that is randomly varied for each of the cylindrical lenses 21.

$$K_D = dD/Dk \times 100$$

(A5) Variation Full Width ΔD [µm] of Aperture Width: Fixed Value

A variation full width ΔD of the aperture width is a difference between an upper limit value $dD_{MAX}$ [µm] and a lower limit value $dD_{MIN}$ [µm] of the variation amount dD of the aperture width, where ΔD is a fixed value set when designing the microlens array 20, and ΔD represents a maximum variation width [µm] when varying the aperture width D.

$$\Delta D = dD_{MAX} - dD_{MIN}$$

(A6) Variation Full Width Rate δD [%] of Aperture Width: Fixed Value

A variation full width rate δD of the aperture width is a ratio (percentage) of "the variation full width ΔD [µm] of the aperture width" to "the reference aperture width Dk [µm]", where δD is a fixed value set when designing the microlens array 20, δD is a ratio of the maximum variation width (a ratio to Dk) when varying the aperture width D and represents a variation range of D, and δD is zero or a positive value.

$$\delta D = \Delta D/Dk \times 100$$

(B) Parameters Concerning Radius of Curvature
(B1) Radius of Curvature R [µm]: Variable Value The radius of curvature R is a radius of curvature in the X direction of each of the cylindrical lenses 21 (see FIG. 2 to FIG. 5). The radius of curvature R is an actual radius of curvature randomly varied for each of the cylindrical lenses 21 and is a variable value. The radius of curvature R represents a radius of curvature of a curved lens surface in a cross-section in the X direction of the cylindrical lenses 21.

(B2) Reference Radius of Curvature Rk [µm]: Fixed Value

A reference radius of curvature Rk is a radius of curvature in the X direction of the reference shape of the cylindrical lenses 21. The reference radius of curvature Rk is a fixed value set when designing the microlens array 20. The reference radius of curvature Rk serves as a reference value (variation center value) when varying the radius of curvature R.

(B3) Variation Amount dR [µm] of Radius of Curvature: Variable Value

A variation amount dR of the radius of curvature is a difference between "the radius of curvature R [µm]" and "the reference radius of curvature Rk [µm]", where dR is a variable value that is randomly varied for each of the cylindrical lenses 21.

$$dR = R - Rk$$

(B4) Variation Rate $K_R$ [±%] of Radius of Curvature: Variable Value

A variation rate $K_R$ of the radius of curvature is a ratio (percentage) of "the variation amount dR [µm] of the radius of curvature" to "the reference radius of curvature Rk [µm]", where $K_R$ is a variable value that is randomly varied for each of the cylindrical lenses 21.

$$K_R = dR/Rk \times 100$$

(B5) Variation Full Width ΔR [µm] of Radius of Curvature: Fixed Value

A variation full width ΔR of the radius of curvature is a difference between an upper limit value $dR_{MAX}$ [µm] and a lower limit value $dR_{MIN}$ [µm] of the variation amount dR of the radius of curvature, where ΔR is a fixed value set when designing the microlens array 20, and ΔR represents a maximum variation width [µm] when varying the radius of curvature R.

$$\Delta R = dR_{MAX} - dR_{MIN}$$

(B6) Variation Full Width Rate δR [%] of Radius of Curvature: Fixed Value

A variation full width rate δR of the radius of curvature is a ratio (percentage) of "the variation full width ΔR [µm] of the radius of curvature" to "the reference radius of curvature Rk [µm]", where δR is a fixed value set when designing the microlens array 20, δR is a ratio of the maximum variation width (a ratio to Rk) when varying the radius of curvature R and represents a variation range of R, and δR is zero or a positive value.

$$\delta R = \Delta R/Rk \times 100$$

(C) Parameters Concerning Off-Center Amount
(C1) Off-Center Amount Ec [µm]: Variable Value The off-center amount Ec is an offset amount in the X direction of the position of the vertex of each of the cylindrical lenses 21 (which hereinafter may also be referred to as a lens vertex position 22) relative to the central position (a central point 23) in the X direction of each of the cylindrical lenses 21 (see FIG. 6). The off-center amount Ec is an actual off-center amount randomly varied for each of the cylindrical lenses 21, and is a variable value. Note that a case in which Ec is a positive value means that the lens vertex position 22 is offset from the central position (the central point 23) in a positive direction of the X direction. On the other hand, a case in which Ec is a negative value means that the lens vertex position 22 is offset from the central position (the central point 23) in a negative direction of the X direction. In this manner, the off-center amount Ec may be either a positive value or a negative value.

(C2) Reference Off-Center Amount Eck [µm]: Fixed Value

A reference off-center amount Eck is an off-center amount of the reference shape of the cylindrical lenses 21. In the present embodiment, the reference off-center amount Eck is 0 µm, whilst Eck may be set at a numeric value other than 0. The reference off-center amount Eck is a reference value (variation center value) when varying the off-center amount Ec.

(C3) Variation Rate $K_{Ec}$ [±%] of Off-Center Amount: Variable Value

A variation rate $K_{Ec}$ of the off-center amount is a ratio (percentage) of "the off-center amount Ec [µm]" to "the reference aperture width Dk [µm]", where $K_{Ec}$ is a variable value that is randomly varied for each of the cylindrical lenses 21.

$$K_{Ec} = Ec/Dk \times 100$$

(C4) Variation Full Width ΔEc [µm] of Off-Center Amount: Fixed Value

A variation full width ΔEc of the off-center amount is a difference between an upper limit value $Ec_{MAX}$ [µm] and a lower limit value $Ec_{MIN}$ [µm] of the off-center amount Ec, where ΔEc is a fixed value set when designing the microlens array 20, and ΔEc represents a maximum variation width [µm] when varying the off-center amount Ec.

$$\Delta Ec = Ec_{MAX} - Ec_{MIN}$$

(C5) Variation Full Width Rate δEc [%] of Off-Center Amount: Fixed Value

A variation full width rate δEc of the off-center amount is a ratio (percentage) of "the variation full width ΔEc [μm] of the off-center amount" to "the reference aperture width Dk [μm]", where δEc is a fixed value set when designing the microlens array 20, δEc is a ratio of the maximum variation width (a ratio to Dk) when varying the off-center amount Ec and represents a variation range of Ec, and δEc is zero or a positive value.

$$\delta Ec = \Delta Ec / Dk \times 100$$

(D) Other Parameters (D1) Root Sum Square K [%]: Fixed Value

A root sum square K is a root sum square of the variation full width rates δD, δR, and δEc described above. The root sum square K [%] is expressed by Expression (10) below, where K is a fixed value set when designing the microlens array 20, and K defines variation ranges when varying the aperture width D, the radius of curvature R, and the off-center amount Ec.

[Math. 4]

$$K = \sqrt{(\delta D)^2 + (\delta R)^2 + (\delta Ec)^2} \qquad (10)$$

(D2) Lens Maximum Height Difference Zmax [μm]

A maximum height difference of a microlens array surface in a region of a reference pattern of the microlens array 20 (a rectangular region such as the unit cell 3 shown in FIG. 1, for example) is denoted by Zmax. The reference pattern may be a rectangular region with a side length of 0.8 mm, 4 mm, or the like, for example. The microlens array 20 is configured by tiling the reference patterns on the X-Y plane of the base material and increasing the area. Thus, Zmax is also equivalent to a maximum height difference of the lens surface of the entire microlens array 20.

5. Method for Locating Microlenses

Figure 6:
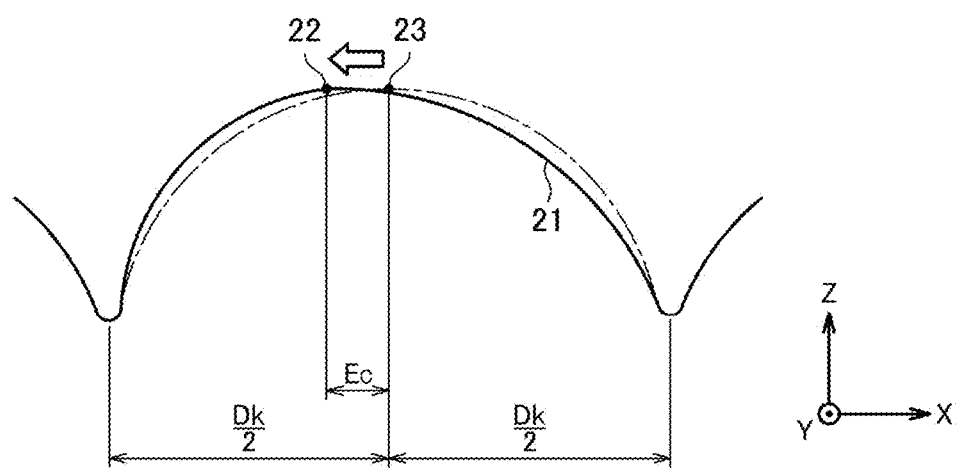
FIG. 6 is a magnified cross-sectional view schematically showing an off-center state of a cylindrical lens according to the embodiment.

Next, a method for locating the microlenses according to the present embodiment will be described in detail with reference to FIG. 2 to FIG. 6. FIG. 6 is a magnified cross-sectional view schematically showing an off-center state of the cylindrical lens 21 according to the present embodiment.

The microlens array 20 in which the plurality of cylindrical lenses 21 having features as described above are arranged can be achieved by a method for locating the microlenses which will be described below.

First, a reference state (hereinafter also referred to as an "initial arrangement state") in which the plurality of cylindrical lenses 21 having the reference shape are arranged in the X direction on the X-Y plane of the base material 10 is set. Then, the initial arrangement state is changed to a state (hereinafter also referred to as a "varied arrangement state") in which the shapes of the cylindrical lenses 21 (for example, the aperture width D and the radius of curvature R in the X direction of the cylindrical lenses 21, the position of the vertex 22, and the like) have been randomly varied. Hereinafter, this method for locating the cylindrical lenses 21 will be referred to as a "reference locating method".

This reference locating method provides randomness for the shape and location of the cylindrical lenses 21 upon undergoing the arrangement of the cylindrical lenses 21 in the regular reference state. Thus, the location of the cylindrical lenses 21 is such that the regular initial arrangement state can be estimated to some extent when looking down on the microlens array 20 in a final varied arrangement state macroscopically to some extent. Hereinafter, this reference locating method will be described in detail.

(1) Initial Arrangement State of Cylindrical Lenses 21

In the reference locating method according to the present embodiment, the initial arrangement state to be used as a reference for locating the cylindrical lenses 21 is set first. Specifically, in the initial arrangement state, the plurality of cylindrical lenses 21 having the same reference shape are regularly arranged on the X-Y plane which is a reference surface with the same reference aperture width Dk (at the same pitch) in the X direction. In this initial arrangement state, the aperture width D in the X direction of the plurality of cylindrical lenses 21 is the same reference aperture width Dk, and the radius of curvature R is the same reference radius of curvature Rk. In addition, in the initial arrangement state, the vertex 22 of each of the cylindrical lenses 21 has not been off-centered in the X direction as shown in FIG. 6 by a dash-dot line (that is, the off-center amount Ec=0 μm), and is located at the position of the central point 23 (reference position) in the X direction of each of the cylindrical lenses 21.

In the initial arrangement state, the planar shape of each of the cylindrical lenses 21 is a rectangular strip shape extending elongatedly in the Y direction (see FIG. 2 and FIG. 4). In addition, the position of the vertex 22 (the lens vertex position 22) of each of the cylindrical lenses 21 conforms with the central point 23 of the reference shape of the cylindrical lenses not having been off-centered (see FIG. 6). In addition, in this initial arrangement state, the aperture width D in the X direction of each of the cylindrical lenses 21 conforms with the reference aperture width Dk (an arrangement pitch in the X direction) (that is, dD=0 μm). In addition, the surface shape of each of the cylindrical lenses 21 in the initial arrangement state is a predetermined reference shape set in advance (for example, a semi-cylindrical shape having the reference radius of curvature Rk).

(2) First Varied Arrangement State with Aperture Width D Varied

After setting the initial arrangement state as described above, the aperture width D in the X direction of the cylindrical lenses 21 is randomly varied to set a first varied arrangement state in which the surface shape of the cylindrical lenses 21 has been varied. The aperture width D is the aperture width in the X direction (the lens diameter in the X direction) of the cylindrical lenses 21 cut by a cross-section of the X-Z plane, and is equivalent to the arrangement pitch in the X direction.

The following is an example of a method for randomly varying the aperture width D of the cylindrical lenses 21. First, the certain reference aperture width Dk [μm] to be used as a reference when varying the aperture width D and the variation full width rate δD [%] are set.

Then, the reference aperture width Dk [μm] is randomly varied within a variation range defined by the variation full width rate δD [%], thereby setting the aperture width D. The aperture width D may be set by randomly varying Dk at a variation rate within ±(δD/2)% (D [μm]=Dk [μm]×(100±(δD/2))[%]), for example. In this case, the variation range of the aperture width D is more than or equal to {Dk [μm]×(100+(δD/2)) [%]} and less than or equal to {Dk [μm]×(100+(δD/2))[%]}. In a case in which δD=10% and Dk=40

μm, for example, D is randomly varied within a variation range of ±5% (=±(δD/2)) using 40 μm (=Dk) as the variation center value. In other words, D is randomly varied within a variation range of 38 μm to 42 μm.

This variation setting operation for the aperture width D is repeated by the number of the respective cylindrical lenses 21 to respectively set aperture widths $D_1, D_2, \ldots, D_n$ in the X direction for the respective cylindrical lenses 21. Note that n is the number of the cylindrical lenses 21 arranged in the X direction.

As described above, the aperture width D of each of the cylindrical lenses 21 in the initial arrangement state is randomly varied to obtain the first varied arrangement state. As a result, the aperture widths D in the X direction of the plurality of cylindrical lenses 21 arranged in the X direction have values different from one another as shown in FIG. 2 to FIG. 5.

In this manner, in the first varied arrangement state, the aperture widths D of the cylindrical lenses 21 are randomly varied. In this first varied arrangement state, the plurality of cylindrical lenses 21 can be located such that surface shapes of the plurality of cylindrical lenses 21 are different from one another as compared with the initial arrangement state. However, in the first varied arrangement state, the radius of curvature R in the X direction of each of the cylindrical lenses 21 conforms with the reference radius of curvature Rk (that is, dR=0 μm). In addition, the position of the vertex 22 of each of the cylindrical lenses 21 conforms with the central point 23 of each rectangular lattice, and has not been off-centered (see the dash-dot line in FIG. 6). In other words, the off-center amount Ec conforms with the reference off-center amount Eck (for example, Eck=0) (that is, Ec=0).

(3) Second Varied Arrangement State with Radius of Curvature R Varied

After setting the first varied arrangement state as described above, the radius of curvature R of the cylindrical lenses 21 is randomly varied to set a second varied arrangement state in which the surface shapes of the cylindrical lenses 21 have been varied. The radius of curvature R is the radius of curvature R of a cross-sectional shape (the radius of curvature in the X direction) of the cylindrical lenses 21 cut by a cross-section of the X-Z plane.

The following is an example of a method for randomly varying the radius of curvature R of the cylindrical lenses 21. First, the certain reference radius of curvature Rk [μm] to be used as a reference when varying the radius of curvature R and the variation full width rate δR [%] are set.

Then, the reference radius of curvature Rk is randomly varied within a variation range defined by the variation full width rate δR [%], thereby setting the radius of curvature R. The radius of curvature R may be set by randomly varying Rk at a variation rate within ±(δR/2)% (R [μm]=Rk [μm]× (100±(δR/2))[%]), for example. In this case, the variation range of the radius of curvature R is more than or equal to {Rk[μm]×(100−(δR/2))[%]} and less than or equal to {Rk [μm]×(100+(δR/2))[%]}. In a case in which δR=20% and Rk=25 μm, for example, R is randomly varied within a variation range of ±10% (=±(δR/2)) using 25 μm (=Rk) as the variation center value. In other words, R is randomly varied within a variation range of 22.5 μm to 27.5 μm.

This variation setting operation for the radius of curvature R is repeated by the number of the respective cylindrical lenses 21 to respectively set radii of curvature $R_1, R_2, \ldots, R_n$ in the X direction for the respective cylindrical lenses 21.

As described above, the radius of curvature R of each of the cylindrical lenses 21 in the first varied arrangement state is randomly varied to obtain the second varied arrangement state. As a result, the radii of curvature R in the X direction of the plurality of cylindrical lenses 21 arranged in the X direction have values different from one another as shown in FIG. 2 to FIG. 5.

As described above, in the second varied arrangement state, the aperture width D and the radius of curvature R of the cylindrical lenses 21 are randomly varied. In this second varied arrangement state, the plurality of cylindrical lenses 21 can be located such that surface shapes of the plurality of cylindrical lenses 21 are further different from one another as compared with the first varied arrangement state. However, in the second varied arrangement state, the position of the vertex 22 of each of the cylindrical lenses 21 conforms with the central point 23 of each rectangular lattice and has not been off-centered (see the dash-dot line in FIG. 6). Note that the example of first varying the aperture width D and then varying the radius of curvature R has been described above, but this is not a limitative example. For example, the radius of curvature R may be varied first, and then the aperture width D may be varied.

(4) Third Varied Arrangement State with Lens Vertex Position Varied

After setting the second varied arrangement state as described above, a third varied arrangement state in which the position in the X direction of the vertex 22 of each of the cylindrical lenses 21 has been randomly off-centered from the central position of the above-described reference shape is set as shown in FIG. 6. Herein, off-centering means varying the planar position of the vertex 22 of the cylindrical lens 21 on the X-Y plane to be offset in the X direction from the position of the central point 23 (central position) of the reference shape. Note that the central point 23 of the reference shape is a midpoint in the X direction of the cylindrical lens 21 having the reference aperture width Dk.

The following is an example of a method for randomly off-centering the position in the X direction of the vertex 22 (the lens vertex position 22) of the cylindrical lens 21 using the central position as a reference.

First, the reference off-center amount Eck of the lens vertex position 22 and the variation full width rate δEc [%] of the off-center amount Ec [μm] are set. As described above, the off-center amount Ec is an offset amount in the X direction of the lens vertex position 22 relative to the central point 23 (a distance in the X direction between the lens vertex position 22 and the central point 23). A reference value (variation center value) when varying the off-center amount Ec is denoted by Eck, and in the present embodiment, Eck=0 [μm]. The variation full width rate δEc [%] is a ratio (percentage) of the variation full width ΔEc [μm] to the reference aperture width Dk [μm], where Eck, δEc, and ΔEc are fixed values set when designing the microlens array 20.

Then, the off-center amount Ec [μm] of each of the cylindrical lenses 21 is set at a value randomly varied within a variation range defined by the variation full width rate δEc [%] using the reference off-center amount Eck as a reference. The off-center amount Ec may be set by randomly varying Dk at a variation rate within ±(δEc/2)%, for example (Ec [μm]=Dk [μm]×(±(δEc/2)[%])). In this case, the variation range of the off-center amount Ec is more than or equal to {Dk [μm]×(−δEc/2)[%]} and less than or equal to {Dk [μm]×(+δEc/2)[%]}. In a case in which δEc=10% and Dk=40 µm, for example, Ec is randomly varied within a variation range of ±5% (=±(δEc/2)) of 40 µm (=Dk) using Eck=0 µm as the variation center value. In other words, Ec is randomly varied within a variation range of −2 µm to +2 µm.

This variation setting operation for the off-center amount Ec is repeated by the number of the respective cylindrical lenses 21 to respectively set off-center amounts $Ec_1$, $Ec_2, \ldots, Ec_n$ in the X direction for the respective cylindrical lenses 21. Accordingly, the lens vertex position 22 of each of the cylindrical lenses 21 is randomly varied in the positive direction or the negative direction of the X direction using the central position (the central point 23) of the reference shape as a reference.

As described above, the lens vertex position 22 in the second varied arrangement state is randomly varied from the central point 23 to obtain a third varied arrangement state. As a result, the lens vertex position 22 of each of the cylindrical lenses 21 is offset from the central point 23 in the X direction by the random off-center amount Ec as shown in FIG. 6.

In this manner, in the third varied arrangement state, the lens vertex position 22 is randomly off-centered. In this third varied arrangement state, the plurality of cylindrical lenses 21 can be located such that surface shapes of the cylindrical lens 21 are further different from one another as compared with the second varied arrangement state.

In addition, in the above-described third varied arrangement state, the height positions in the Z direction of the vertices 22 of the plurality of cylindrical lenses 21 (the positions in the thickness direction of the diffusion plate 1) are varied from one another. In detail, the height positions of the vertices 22 of the plurality of cylindrical lenses 21 arranged in the X direction (deepest points of concave lenses or highest points of convex lenses) are different from one another as shown in FIG. 2 to FIG. 5. This can further increase randomness of the surface shapes of the plurality of cylindrical lenses 21 to provide the microlens array 20 with sufficient non-periodicity.

(5) Conclusion

As described above, in the method for locating the cylindrical lenses 21 according to the present embodiment, the plurality of cylindrical lenses 21 are regularly arranged first (the initial arrangement state). Thereafter, the aperture width D, the radius of curvature R, and the off-center amount Ec of the lens vertex position 22 of the laid-out plurality of cylindrical lenses 21 are randomly varied (the first, second, and third varied arrangement states). Accordingly, the surface shapes of the regularly arranged cylindrical lenses 21 can be randomly varied. Thus, a highly-random three-dimensional surface structure of the microlens array 20 can be achieved while achieving a quasi-regular arrangement of the cylindrical lenses 21.

Consequently, the microlens array 20 according to the present embodiment enables an overlapping state of phases of light emanating from the respective cylindrical lenses 21 to be suitably controlled. Thus, interference of diffusion light from the respective cylindrical lenses 21 and diffraction due to the periodic structure of the microlens array 20 can be suitably suppressed. This can reduce unevenness of the intensity distribution of linear diffusion light in the X direction to improve homogeneity of light distribution in the X direction. Further, anisotropy of light distribution in the X direction and the cutoff properties of the intensity distribution of diffusion light can also be controlled.

Note that the cutoff properties mean that diffusion light from the microlens array 20 has what is called top hat type diffusion properties. The top hat type diffusion properties refer to an optical function in which homogeneity of an energy distribution is very high within an angular component in a certain region with respect to collimated light in a visible light region or telecentric light having a principal ray with collimating properties and having a certain aperture, and when the certain region of this angular component is exceeded, energy may be abruptly reduced. When such top hat type diffusion properties are achieved, a state is achieved in which a luminance distribution of diffusion light of light incident on the microlens array 20 is generally uniform within a predetermined diffusion angular range, and the luminance value of diffusion light falls within a range of ±20%, for example, centering on an average value of peak levels within the predetermined diffusion angular range (see FIG. 8 which will be described later).

In the microlens array 20 according to the present embodiment, the plurality of cylindrical lenses 21 are arranged on the X-Y plane by the above-described locating method, and the aperture width D, the radius of curvature R, the off-center amount Ec of the lens vertex position 22 of each of the cylindrical lenses 21, and the like are appropriately varied, so that the surface shapes of the cylindrical lenses 21 are varied to introduce curved surface shapes distorted from a semi-cylindrical shape. This can achieve desired diffusion properties of the microlens array 20, so that the top hat type diffusion properties can be achieved more reliably.

Further, according to the present embodiment, the plurality of cylindrical lenses 21 having the same reference shape (for example, the semi-cylindrical shape defined by the predetermined reference aperture width Dk and the predetermined reference radius of curvature Rk) are regularly arranged on the X-Y plane (the initial arrangement state), and then the aperture width D, the radius of curvature R, and the off-center amount Ec of the lens vertex position 22 are varied (the above-described first, second, and third varied arrangement states). This enables the plurality of cylindrical lenses 21 to be continuously located without any gaps between one another on the surface of the diffusion plate 1 while ensuring randomness of the surface shapes of the individual cylindrical lenses 21. Consequently, a flat portion can be prevented from existing in the boundary portion between adjacent ones of the cylindrical lenses 21 wherever possible, so that the component of incoming light that is transmitted as it is without being scattered by the surface of the diffusion plate 1 (the zero-order transmitted light component) can be suppressed. As a result, homogeneity of linear light distribution in the X direction and diffusion performance can be improved further.

6. Variation Requirements for Respective Parameters

Next, variation requirements for the respective parameters (the aperture width D, the radius of curvature R, and the off-center amount Ec) of the cylindrical lenses 21 according to the present embodiment will be described in detail.

As described above, in the microlens array 20 according to the present embodiment, the aperture width D [µm] in the X direction of each of the cylindrical lenses 21 is randomly varied within the variation range defined by the variation full width rate δD [%] using the reference aperture width Dk as a reference. In addition, the radius of curvature R [µm] of each of the cylindrical lenses 21 is randomly varied within the variation range defined by the variation full width rate δR [%] using the reference radius of curvature Rk as a reference. Further, the lens vertex position 22 of each of the cylindrical lenses 21 is off-centered in the X direction from the central position (the position in the X direction of the central point 23 in the reference shape of each of the cylindrical lenses). Then, the off-center amount Ec [μm] of each of the cylindrical lenses 21 is randomly varied within the variation range defined by the variation full width rate δEc [%].

Further, the microlens array 20 according to the present embodiment preferably satisfies variation requirements as will be described below.

(1) Requirement that δD≠0 [%] and/or δR≠0 [%]

First, the microlens array 20 according to the present embodiment satisfies a requirement that at least either the variation full width rate δD [%] or the variation full width rate δR [%] is not 0 [%] (δD≠0 [%] and/or δR≠0 [%]). This means that either the aperture width D or the radius of curvature R of each of the cylindrical lenses 21, or both of them, is/are randomly varied within the predetermined variation range(s) defined by δD and/or δR.

In other words, the case in which δD is not 0 [%] (that is, a case in which δD>0 [%]) means that the aperture width D of each of the cylindrical lenses 21 is randomly varied within the variation range defined by δD. On the other hand, a case in which δD is 0 [%] means that the aperture width D of each of the cylindrical lenses 21 is not varied but has a constant value (for example, the same reference aperture width Dk). Similarly, the case in which δR is not 0 [%] (that is, a case in which δR>0 [%]) means that the radius of curvature R of each of the cylindrical lenses 21 is randomly varied within the variation range defined by δR. Conversely, a case in which δR is 0 [%] means that the radius of curvature R is not varied but has a constant value (for example, the same reference radius of curvature Rk).

In this manner, at least either δD or δR is not 0 [%] in the present embodiment. Accordingly, either the aperture width D or the radius of curvature R of each of the cylindrical lenses 21, or both of them, is/are randomly varied. Herein, if the condition that at least either δD or δR is not 0 [%] is satisfied, δEc may be 0 [%] or may not be 0 [%] (δEc>0 [%]). The case in which δEc is not 0 [%] means that the lens vertex position 22 of each of the cylindrical lenses 21 is off-centered by the random off-center amount Ec within the variation range defined by δEc, and is located at a position offset from the central position. On the other hand, the case in which δEc is 0 [%] means that the lens vertex position 22 of each of the cylindrical lenses 21 is not off-centered but located at the central position.

As described above, the microlens array 20 according to the present embodiment satisfies the requirement that δD≠0 [%] and/or δR≠0 [%]. Thus, in a case in which each of the cylindrical lenses 21 is off-centered by the random off-center amount Ec (δEc≠0[%]) but neither the aperture width D nor the radius of curvature R is varied (δD=0 [%] and δR=0 [%]), the variation requirement for the microlens array 20 according to the present embodiment is not satisfied. That is, a case in which δD=0 [%] and δR=0 [%] are satisfied does not fall under the microlens array 20 according to the present embodiment. In the present embodiment, excellent light distribution properties and homogeneity of linear diffusion light as described above can be obtained by varying at least either the aperture width D or the radius of curvature R, and preferably both of them.

(2) Requirements for Root Sum Square K of δD, δR, and δEc

Next, in the microlens array 20 according to the present embodiment, the variation full width rate δD [%], the variation full width rate δR [%], and the variation full width rate δEc [%] satisfy Expression (1) below.

[Math. 5]

$$\sqrt{(\delta D)^2+(\delta R)^2+(\delta Ec)^2} \geq 9 \quad (1)$$

$$K=\sqrt{(\delta D)^2+(\delta R)^2+(\delta Ec)^2} \quad (10)$$

Herein, the left side of Expression (1) is the root sum square K of the variation full width rates δD, δR, and δEc. The root sum square K [%] is expressed by Expression (10) described above.

In the microlens array 20 according to the present embodiment, the root sum square K of δD, δR, and δEc is more than or equal to 9 [%](K≥9) as shown in Expression (1) above. In other words, the lower limit value of K is 9 [%]. Effects as will be described below are obtained by setting δD, δR, and δEc to satisfy Expression (1) to make K more than or equal to 9.

Figure 7:
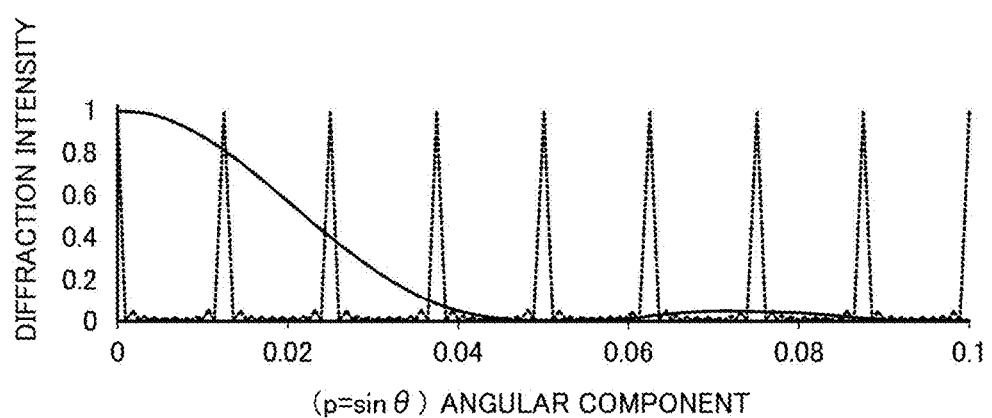
FIG. 7 is a graph showing an example of intensity of diffraction light due to a periodic structure of the microlens array.

In the microlens array 20 that emits straight diffusion light (uniaxial linear diffusion light) advancing in a specific direction (for example, the X direction), diffraction (a solid line in FIG. 7) caused by an element (that is, each of the cylindrical lenses 21) of the microlens array 20 and diffraction (a broken line in FIG. 7) caused by the periodic structure of the microlens array 20 (that is, the whole plurality of cylindrical lenses 21 arranged in the X direction) are superimposed to produce spectral diffraction light having an angle and intensity of their intersection, as shown in FIG. 7.

Describing in more detail, diffusion light (the solid line in FIG. 7) emitted from each of the cylindrical lenses 21 is homogeneously distributed generally in the X direction due to a diffraction function of the lens surface of each of the cylindrical lenses 21, as shown in FIG. 7. On this occasion, each diffusion light ray is homogeneously distributed with light distribution of its ide-angle component being decreased and with diffraction light being included in one direction. On the other hand, in the microlens array 20 in which the cylindrical lenses 21 having the same shape (that is, the same aperture width D and the same lens phase surface) are periodically arranged, the above-described homogeneous light distribution (the solid line in FIG. 7) caused by each of the cylindrical lenses and diffraction (the broken line in FIG. 7) caused by the periodic structure of the microlenses are superimposed to produce spectral diffraction light (spectral noise: noise of peak-like diffraction light caused by the periodic structure).

Herein, in a case in which K described above is less than 9, the variation amounts of the aperture width D and the radius of curvature R of each of the cylindrical lenses 21 and the off-center amount Ec of the lens vertex position 22 are brought into an inappropriate state, so that the phase state of the microlens structure surface cannot be appropriately made random. Thus, the above-described homogeneous light distribution (the solid line in FIG. 7) caused by each of the cylindrical lenses 21 and diffraction (the broken line in FIG. 7) caused by the periodic structure of the microlens array 20 are superimposed to produce spectral noise, resulting in degraded homogeneity of linear diffusion light. Further, noise of zero-order diffraction light is produced, so that distribution of linear diffusion light is biased, resulting in degraded light distribution properties in the X direction as well.

In contrast to this, in the microlens array 20 according to the present embodiment, the aperture width D, the radius of curvature R, and the off-center amount Ec are randomly varied to satisfy Expression (1) above to make K more than or equal to 9. Accordingly, variation of the aperture width D and the radius of curvature R (both of which are phases) of each of the cylindrical lenses 21 and off-centering of the lens vertex position 22 (a change in phase distribution) enable the phase state of the microlens structure surface to be appropriately made random.

Accordingly, mutually different light distribution components from the respective cylindrical lenses 21 are superimposed (mixed), so that the luminance distribution of the above-described spectral diffraction light is widened, and light distribution which is homogeneous in the X direction and has a smooth spread can be achieved. That is, generally homogeneous but mutually different light distribution components from the respective cylindrical lenses 21 can be superimposed (mixed). Consequently, spectral diffraction light (spectral noise) which is the diffraction phenomenon of the periodic structure can be solved to achieve homogeneous light distribution. Thus, in the microlens array 20 that emits linear diffusion light, spectral noise produced by the diffraction phenomenon of the periodic structure of the microlens array 20 can be reduced to improve homogeneity of intensity of linear diffusion light. In addition, noise of zero-order diffraction light can be reduced to also improve light distribution properties in a specific direction (the X direction) of the above-described linear diffusion light.

In addition, in Expression (1) above, a varied state of microlens shapes is evaluated using the root sum square K of the variation full width rates $\delta D$, $\delta R$, and $\delta Ec$ as a parameter. Accordingly, the varied state of microlens shapes can be appropriately evaluated comprehensively considering variation of the aperture width D and the radius of curvature R of the cylindrical lenses 21 as well as the off-center amount Ec of the lens vertex position 22.

Further, in Expression (1) above, the root sum square K of the variation full width rates $\delta D$, $\delta R$, and $\delta Ec$ [%] is used as a parameter instead of a root sum square of the variation rates $K_D$, $K_R$, and $K_{Ec}$ [±%]. Accordingly, the varied state of microlens shapes can be appropriately evaluated considering the variation ranges of the microlens array 20 in the real space wherever possible. The centers of the random variation rates $K_D$, $K_R$, and $K_{Ec}$ [±%] are actually not necessarily be zero as a reference, but biases are highly likely to occur. However, it is inferred that the variation full widths of actual variation amounts dD, dR, and Ec follow the predetermined variation full width rates $\delta D$, $\delta R$, and $\delta Ec$ [%] set in advance. Thus, the root sum square K of the variation full width rates $\delta D$, $\delta R$, and $\delta Ec$ [%] preferably is used as a parameter in Expression (1) for evaluating the light distribution properties and homogeneity of diffusion light.

Figure 8:
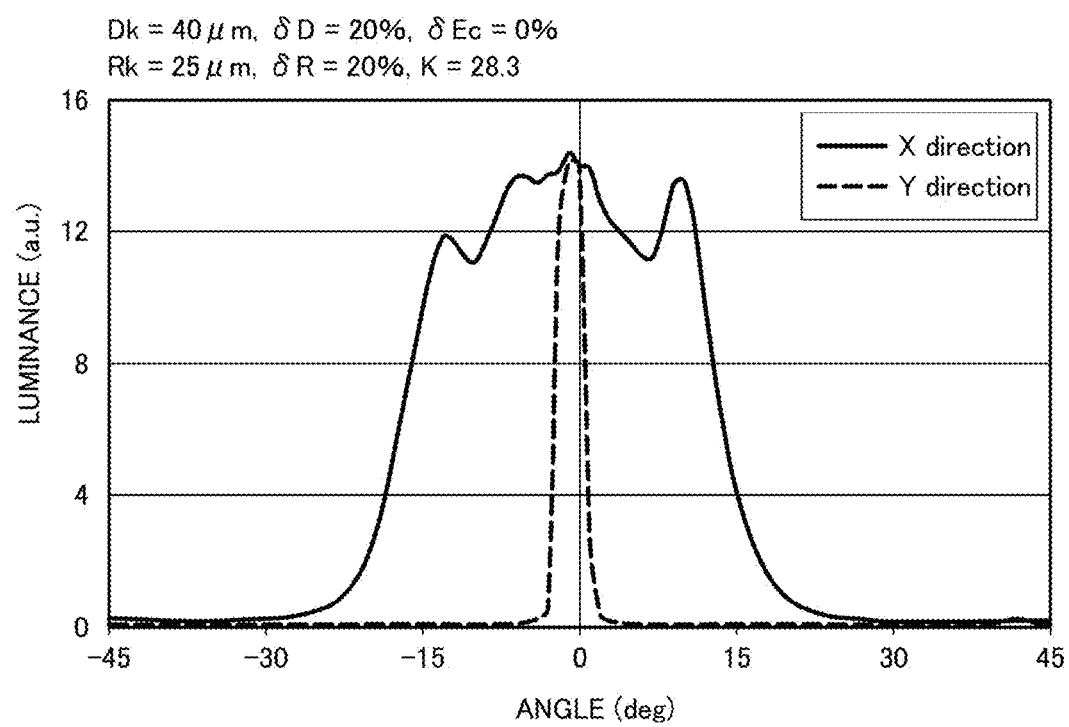
FIG. 8 is a graph showing an example of light distribution properties achieved by the diffusion plate according to the embodiment.

Herein, the light distribution properties achieved by the diffusion plate 1 according to the present embodiment will be described with reference to FIG. 8. FIG. 8 is a graph showing an example of light distribution properties achieved by the diffusion plate 1 according to the present embodiment. The vertical axis of the graph of FIG. 8 represents a luminance level of diffusion light diffused by the microlens array 20, and the horizontal axis of the graph of FIG. 8 indicates a diffusion angle of diffusion light emitted from the diffusion plate 1. A solid line in the graph indicates a luminance distribution in the X direction (the arrangement direction of the cylindrical lenses 21) of linear diffusion light, and a broken line indicates a luminance distribution in the Y direction (the longitudinal direction of the cylindrical lenses 21) of the linear diffusion light.

In the example shown in FIG. 8, as to variation parameters of lens shapes of the cylindrical lenses 21. Dk=40 μm, Rk=25 μm, $\delta D$=20%, $\delta R$=20%, and $\delta Ec$=0% are set. In this case, K=28.3 holds, which satisfies the condition of Expression (1) (K≥9).

As shown in FIG. 8, the diffusion angle (full width at half maximum: FWHM) in the X direction of diffusion light from the diffusion plate 1 according to the present embodiment is about 30°, whilst the diffusion angle (full width at half maximum: FWHM) in the Y direction of the diffusion light is about 2°. Thus, the diffusion plate 1 according to the present embodiment enables linear diffusion light having a directivity to a specific direction (the X direction) to be suitably generated. As to the luminance distribution in the X direction (the solid line in FIG. 8), the luminance level of diffusion light is generally homogeneous in an angular range in which the diffusion angle is generally −10° to 10°, and falls within a range of ±15% of a center value (=about 12.5) of the luminance level. Thus, the spectral noise is sufficiently reduced, the luminance distribution in the X direction is smooth, and homogeneity of light distribution in the X direction is high. In addition, no noticeable zero-order diffraction light (noise) is observed around 0°, diffusion light is distributed dispersedly in the X direction, and the light distribution properties are also high.

As described above, the diffusion plate 1 according to the present embodiment enables the homogeneity and light distribution properties of diffusion light to be improved as shown in FIG. 8 by randomly varying the lens shape of each of the cylindrical lenses 21 under the variation condition that satisfies Expression (1) above. In addition, the top hat type diffusion properties can also be achieved as shown in FIG. 8 by controlling the cutoff properties of the intensity distribution of diffusion light.

(3) Preferable Requirement for Root Sum Square K of $\delta D$, $\delta R$, and $\delta Ec$ Further, $\delta D$, $\delta R$, and $\delta Ec$ preferably satisfy Expression (2) below. That is, the root sum square K of the variation full width rates $\delta D$, $\delta R$, and $\delta Ec$ preferably is more than or equal to 14[%].

[Math. 6]

$$\sqrt{(\delta D)^2 + (\delta R)^2 + (\delta Ec)^2} \geq 14 \tag{2}$$

When K is more than or equal to 14, an effect that at least one of or both the homogeneity and light distribution properties of diffusion light can be improved more remarkably is exerted. In detail, when K is more than or equal to 14, spectral noise produced by the diffraction phenomenon of the periodic structure of the microlens array 20 can be reduced more remarkably to further improve the homogeneity of linear diffusion light. In addition, zero-order diffraction light (noise) can be reduced more to further improve the light distribution properties in the X direction of diffusion light.

In addition, $\delta D$, $\delta R$, and $\delta Ec$ preferably satisfy Expression (3) below. That is, the root sum square K of $\delta D$, $\delta R$, and $\delta Ec$ preferably is less than 46.9 [%]. Expression (3) is an expression that represents a physical configuration condition of the microlens array 20 according to the present embodiment.

[Math. 7]

$$(\delta D)^2 + (\delta R)^2 + (\delta Ec)^2 < 46.9 \tag{3}$$

When K is more than or equal to 46.9, variation of the surface shapes of the respective cylindrical lenses 21 becomes excessively large, resulting in a problem of loss of achievability of the microlens structure and deterioration of the light distribution properties of the microlenses.

This problem will be described in more detail. As shown in FIG. 1, the diffusion plate 1 according to the present embodiment is configured by, for example, arranging the plurality of rectangular unit cells 3 (reference patterns) vertically and horizontally on the X-Y plane of the diffusion plate 1. When deploying the plurality of unit cells 3 on the X-Y plane in this manner, continuity of the lens structure of the cylindrical lenses 21 preferably is maintained at the boundary between the unit cells 3. In addition, in a portion other than the boundary portion, it is also preferable to continuously store the plurality of cylindrical lenses 21 without any gaps in a predetermined region on the X-Y plane of the diffusion plate 1.

In this respect, when variation of the surface shapes of the individual cylindrical lenses 21 is excessively large, it is difficult to maintain continuity of the lens structure between mutually adjacent ones of the cylindrical lenses 21. As a result, the plurality of cylindrical lenses 21 fail to be continuously stored without any gaps in the predetermined region on the X-Y plane to produce a defect in the microlens structure or the like, so that the physical configuration condition of the microlens array 20 is not satisfied in some cases.

For example, in a case in which δD and δR are more than or equal to 30% and δEc is more than or equal to 20%, K becomes more than or equal to 46.9. In a case of designing the microlens array 20 under the variation condition that K becomes more than or equal to 46.9 in this manner, a defect occurs in the microlens structure as described above, so that the physical configuration condition of the microlens structure is not satisfied.

Consequently, it is preferable to set the variation condition (that is, the variation full width rates δD, δR, and δEc of the aperture width D, the radius of curvature R, and the off-center amount Ec) of the cylindrical lenses 21 such that Expression (3) above is satisfied and K becomes less than 46.9. This enables the variation amounts of the aperture width D, the radius of curvature R, and the off-center amount Ec of the individual cylindrical lenses 21 to fall within appropriate variation ranges that can achieve the microlens structure. Consequently, the continuity of the lens structure can be maintained between mutually adjacent ones of the cylindrical lenses 21 on the X-Y plane, and the plurality of cylindrical lenses 21 can be continuously stored without any gaps in the predetermined region on the X-Y plane. This can suppress occurrence of a defect in the microlens structure, so that the physical configuration condition of the microlens array 20 can be satisfied. As a result, the microlens array 20 can be suitably achieved, and deterioration of the light distribution properties can also be suppressed.

(4) Variation Full Width Rate δD of Aperture Width D

Herein, the variation full width rate δD preferably is more than or equal to 7% and less than 30%. When δD is more than or equal to 7%, the aperture width D can be sufficiently varied, which can bring an effect that the light distribution properties and homogeneity of diffusion light achieved by the microlens array 20 can be improved, and occurrence of zero-order diffraction light (noise) can be suppressed, in conjunction with variation of the other variation elements (such as the radius of curvature R and the off-center amount Ec). In contrast to this, when δD is less than 7%, variation of the aperture width D may become insufficient to degrade the light distribution properties and homogeneity of diffusion light. On the other hand, when δD is more than or equal to 30%, variation of the aperture width D becomes excessively large. Thus, as described above, the plurality of cylindrical lenses 21 fail to be continuously stored without any gaps in the predetermined region on the X-Y plane, which produces a defect in the microlens structure or the like, so that the physical configuration condition of the microlens array 20 is not satisfied.

Consequently, δD preferably is more than or equal to 7% and less than 30%, and more preferably is less than or equal to 25%. Accordingly, the physical configuration condition of the microlens array 20 can be satisfied while improving the light distribution properties and homogeneity of diffusion light.

(5) Variation Full Width Rate δR of Radius of Curvature R

The variation full width rate δR preferably is more than or equal to 7% and less than 30%. When δR is more than or equal to 7%, the radius of curvature R can be sufficiently varied, which can bring an effect that the light distribution properties and homogeneity of diffusion light achieved by the microlens array 20 can be improved, and occurrence of zero-order diffraction light (noise) can be suppressed, in conjunction with variation of the other variation elements (such as the aperture width D and the off-center amount Ec). In contrast to this, when δR is less than 7%, variation of the radius of curvature R may become insufficient to degrade the light distribution properties and homogeneity of diffusion light. On the other hand, when δR is more than or equal to 30%, variation of the radius of curvature R will become excessively large. Thus, as described above, the plurality of cylindrical lenses 21 fail to be continuously stored without any gaps in the predetermined region on the X-Y plane, which produces a defect in the microlens structure or the like, so that the physical configuration condition of the microlens array 20 is not satisfied.

Consequently, δR preferably is more than or equal to 7% and less than 30%, and more preferably is less than or equal to 25%. Accordingly, the physical configuration condition of the microlens array 20 can be satisfied while improving the light distribution properties and homogeneity of diffusion light.

(6) Variation Full Width Rate δEc of Off-Center Amount Ec

The variation full width rate δEc preferably is more than or equal to 7% and less than or equal to 30%. When δEc is more than or equal to 7%, the off-center amount Ec can be sufficiently varied, which can bring an effect that the light distribution properties and homogeneity of diffusion light achieved by the microlens array 20 can be improved, and occurrence of zero-order diffraction light (noise) can be suppressed, in conjunction with variation of the other variation elements (such as the aperture width D and the radius of curvature R). In contrast to this, when δEc is less than 7%, variation of the off-center amount Ec may become insufficient to degrade the light distribution properties and homogeneity of diffusion light. On the other hand, when δEc exceeds 30%, variation of the off-center amount Ec becomes excessively large. Thus, as described above, the plurality of cylindrical lenses 21 fail to be continuously stored without any gaps in the predetermined region on the X-Y plane, which produces a defect in the microlens structure or the like, so that the physical configuration condition of the microlens array 20 is not satisfied.

Consequently, δEc preferably is more than or equal to 7% and less than or equal to 30%, and more preferably is less than or equal to 20%. Accordingly, the physical configuration condition of the microlens array 20 can be satisfied while improving the light distribution properties and homogeneity of diffusion light.

7. Method for Manufacturing Microlenses

Figure 9:
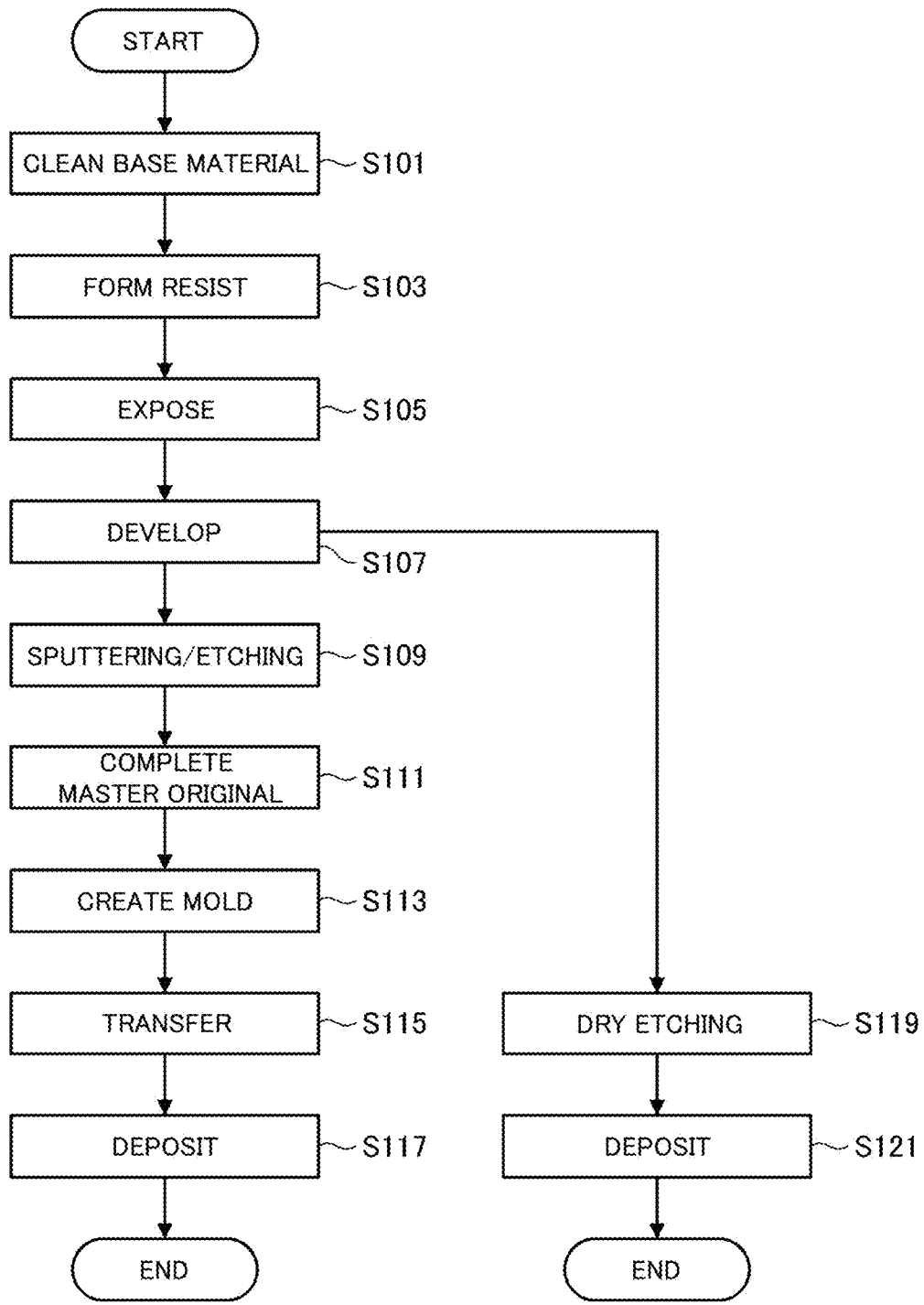
FIG. 9 is a flowchart showing a method for manufacturing the diffusion plate according to the embodiment.
Figure 10:
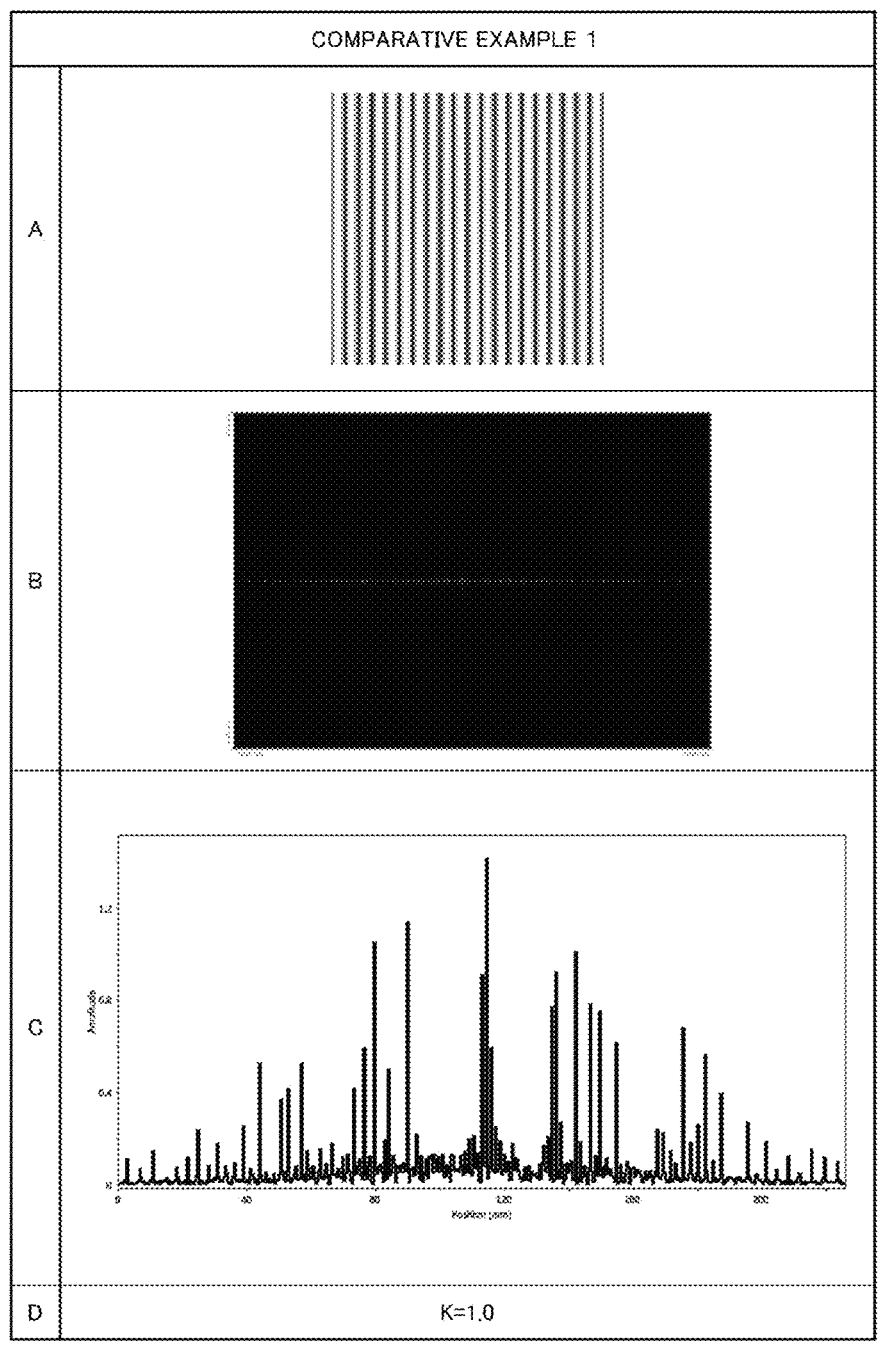
FIG. 10 shows explanatory diagrams concerning a diffusion plate according to Comparative Example 1.
Figure 11:
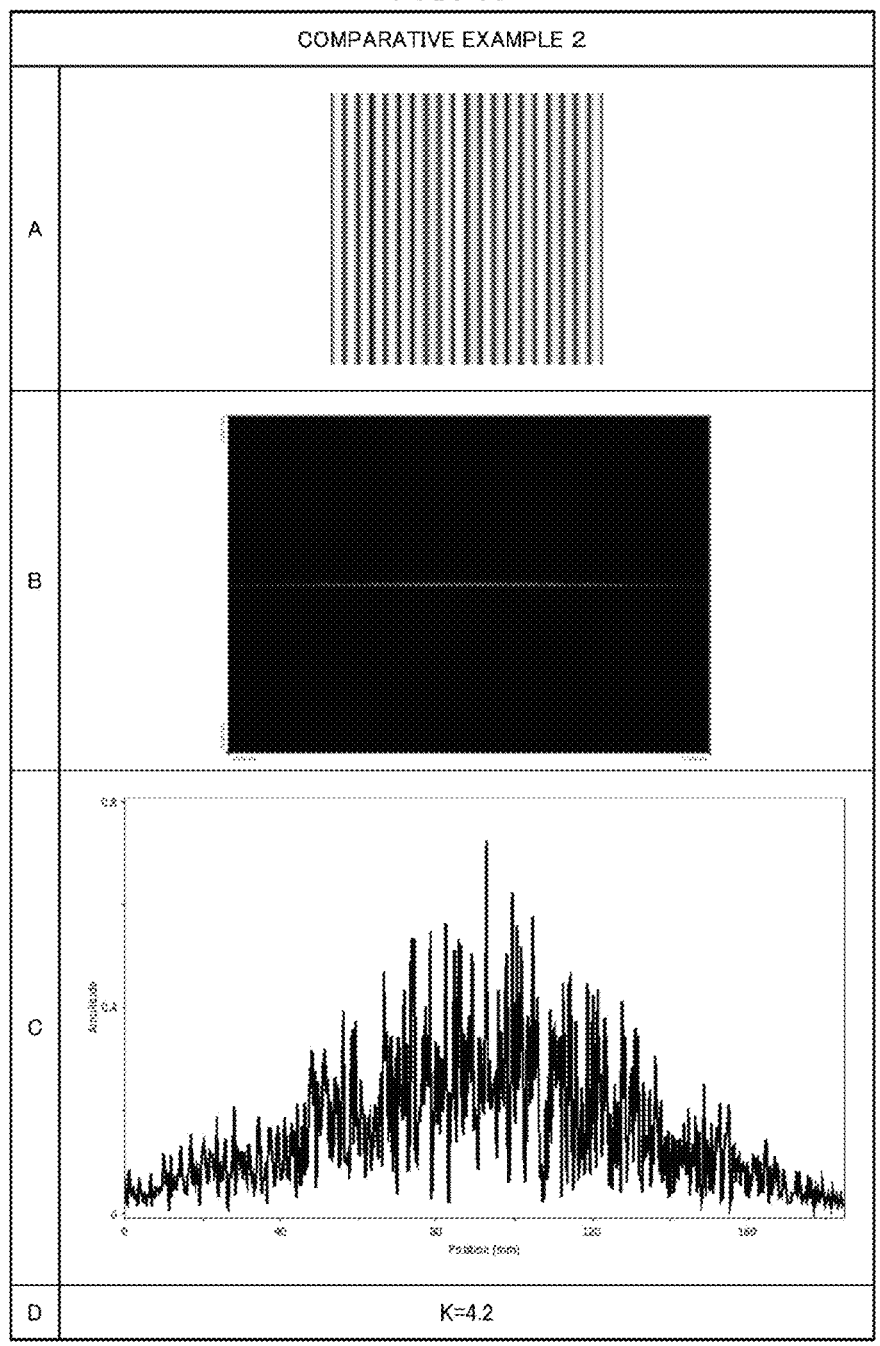
FIG. 11 shows explanatory diagrams concerning a diffusion plate according to Comparative Example 2.
Figure 12:
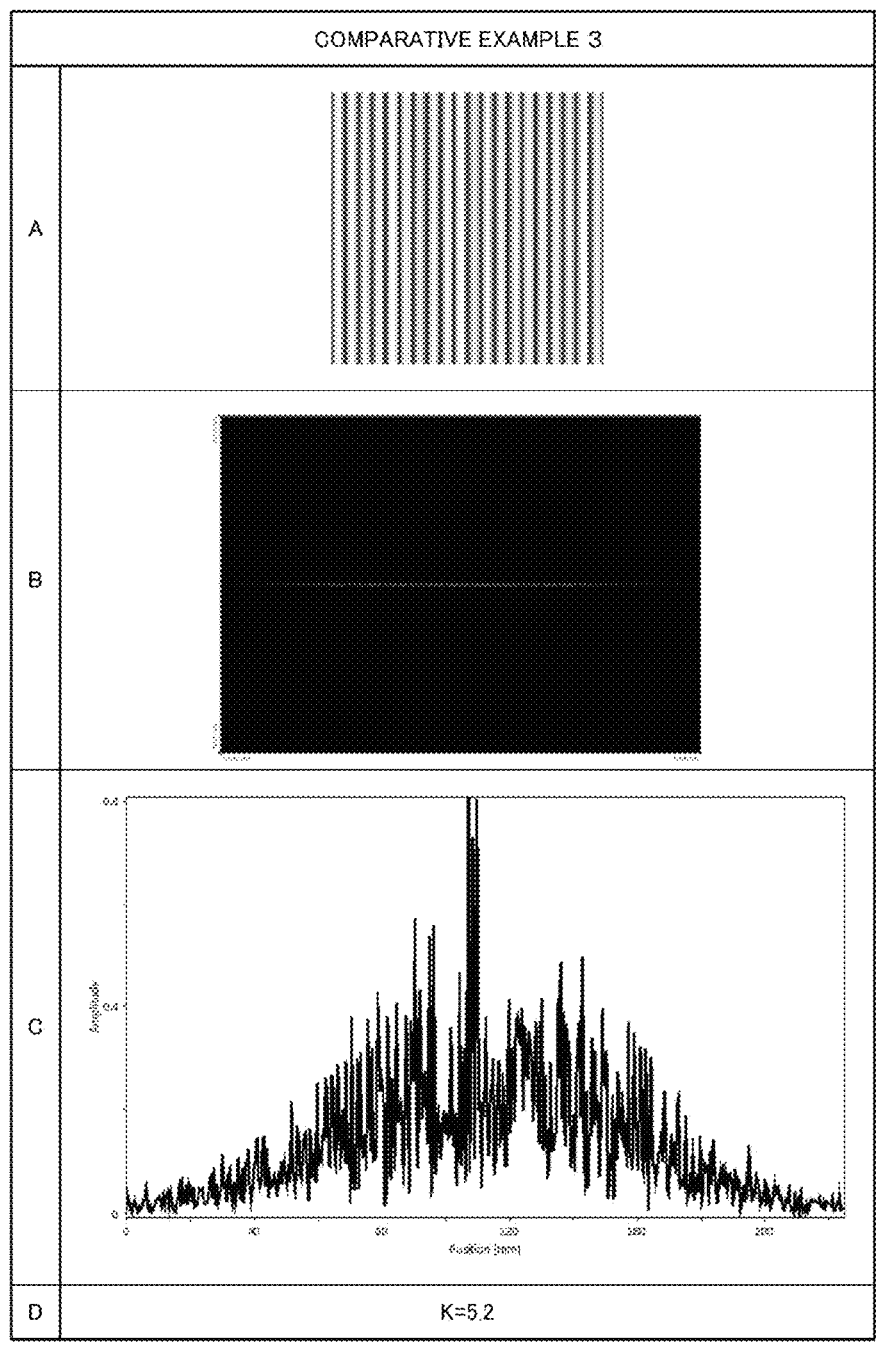
FIG. 12 shows explanatory diagrams concerning a diffusion plate according to Comparative Example 3.
Figure 13:
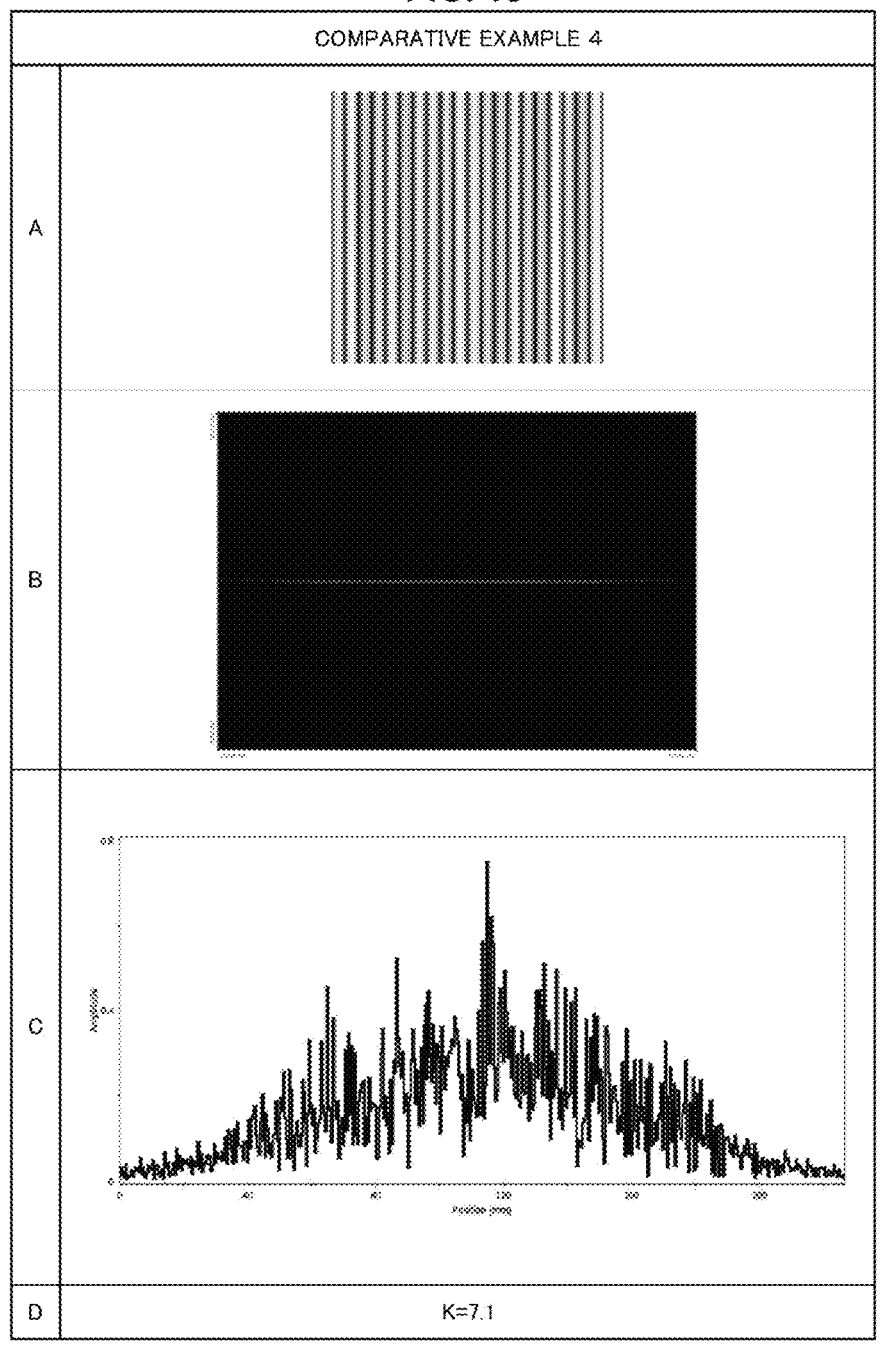
FIG. 13 shows explanatory diagrams concerning a diffusion plate according to Comparative Example 4.
Figure 14:
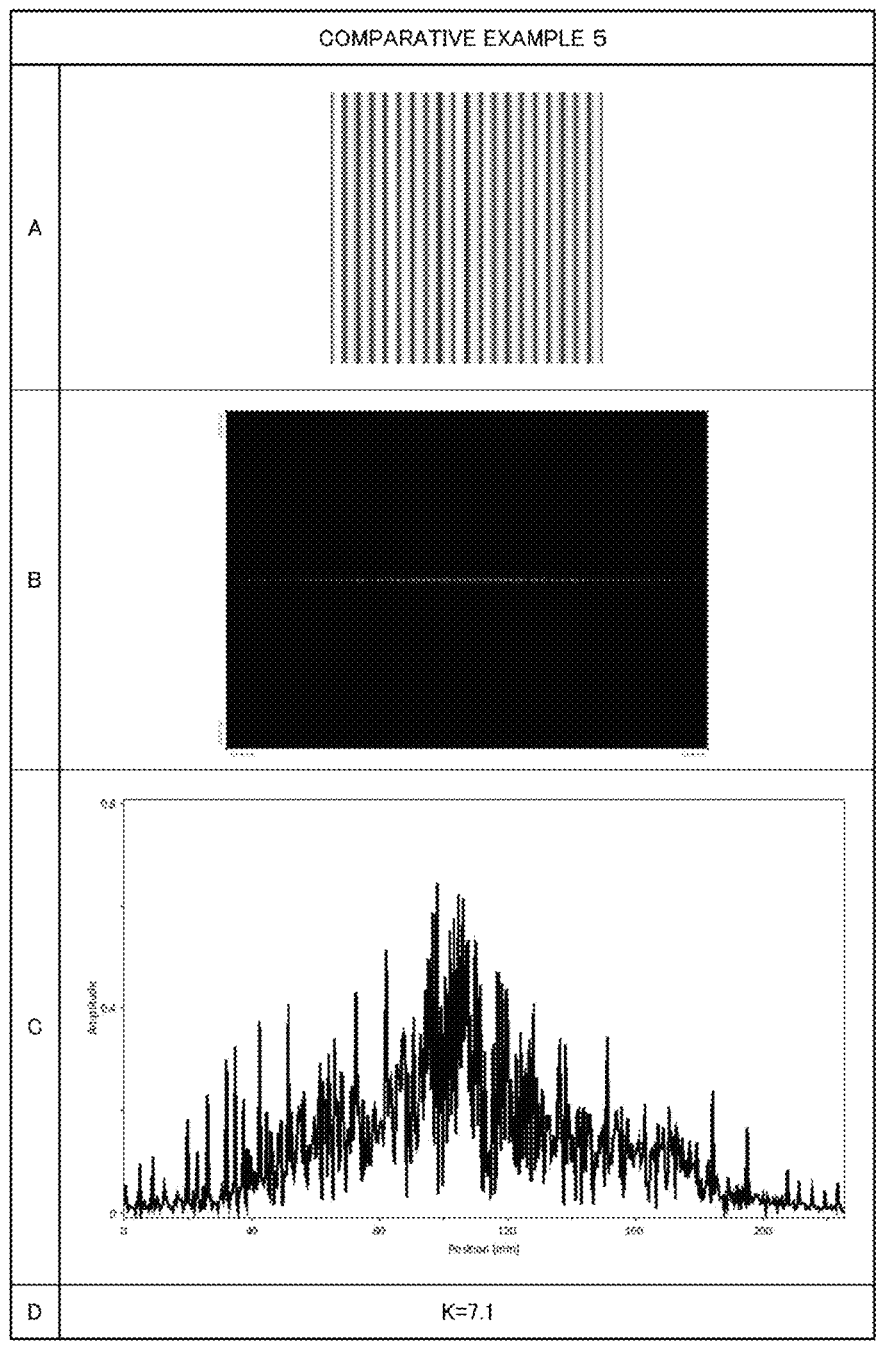
FIG. 14 shows explanatory diagrams concerning a diffusion plate according to Comparative Example 5.
Figure 15:
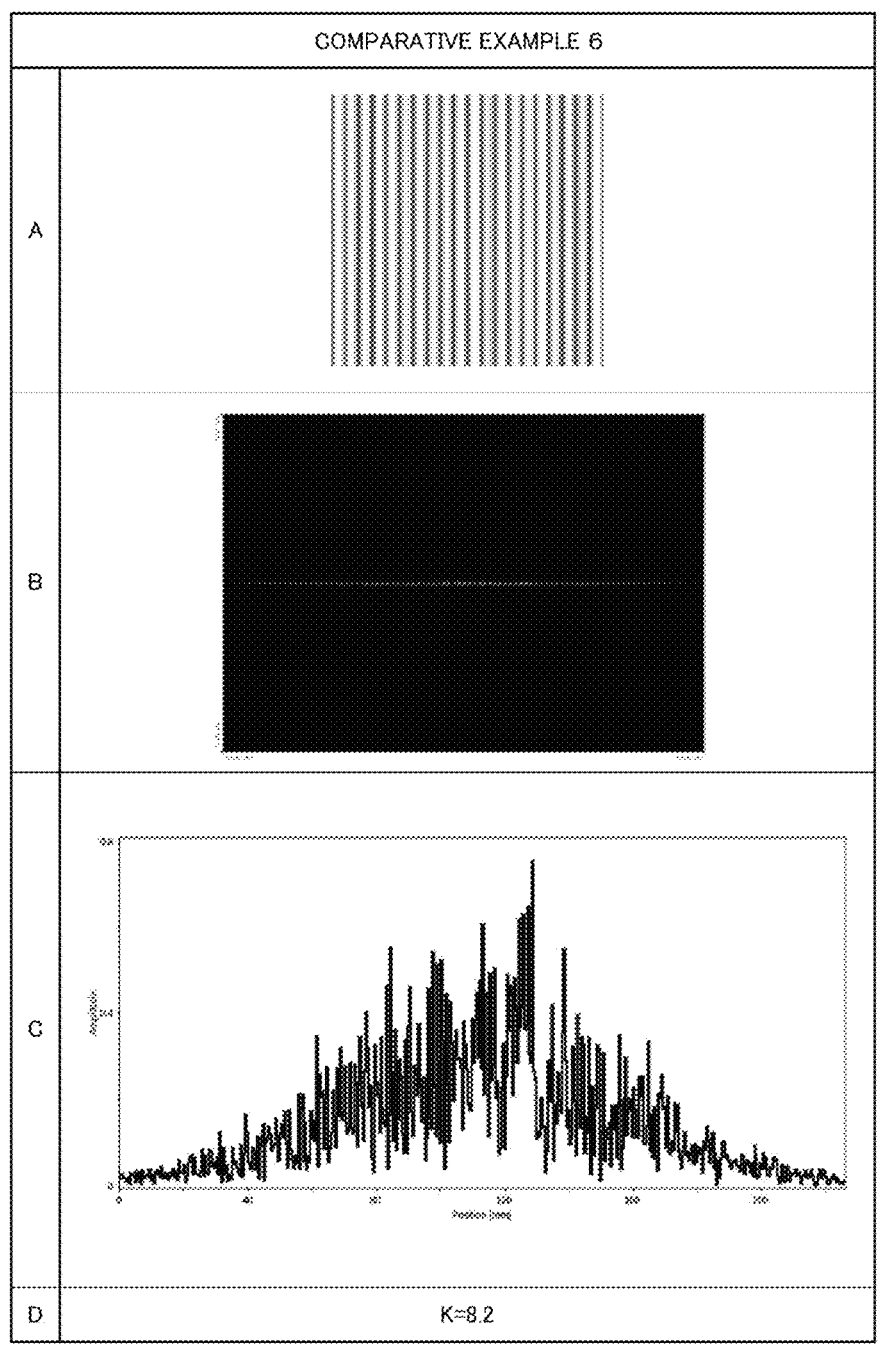
FIG. 15 shows explanatory diagrams concerning a diffusion plate according to Comparative Example 6.
Figure 16:
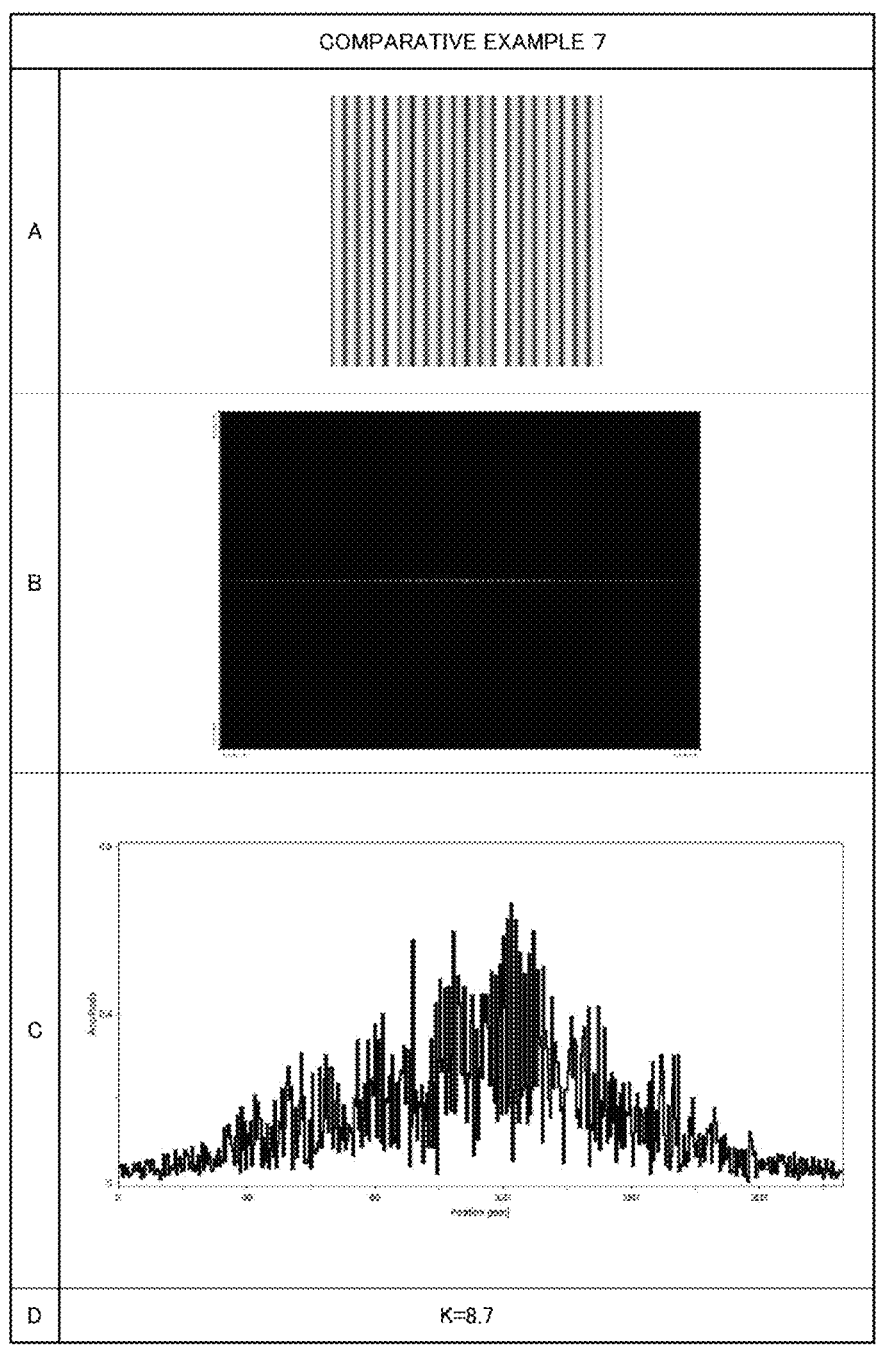
FIG. 16 shows explanatory diagrams concerning a diffusion plate according to Comparative Example 7.
Figure 17:
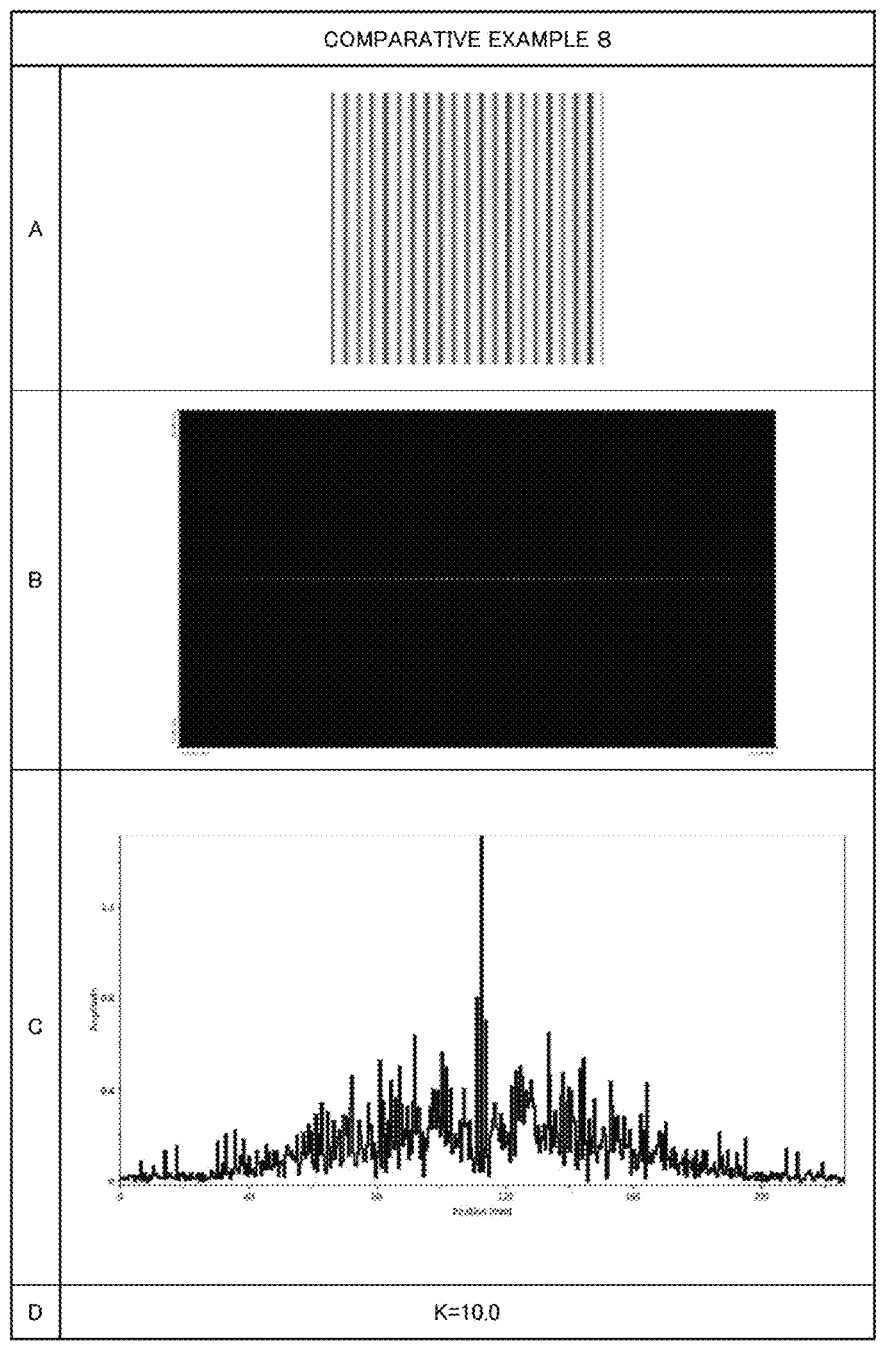
FIG. 17 shows explanatory diagrams concerning a diffusion plate according to Comparative Example 8.
Figure 18:
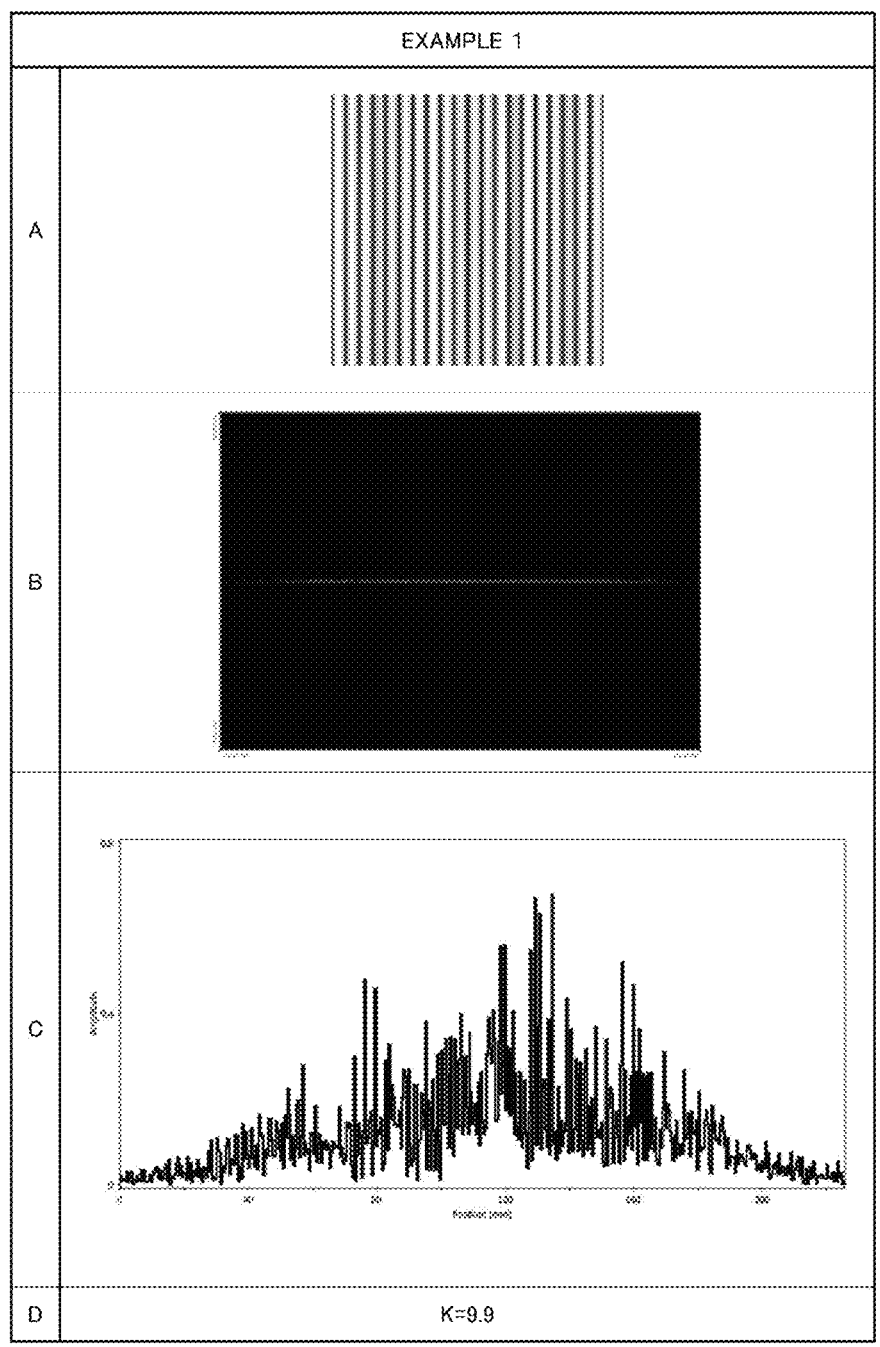
FIG. 18 shows explanatory diagrams concerning a diffusion plate according to Example 1.
Figure 19:
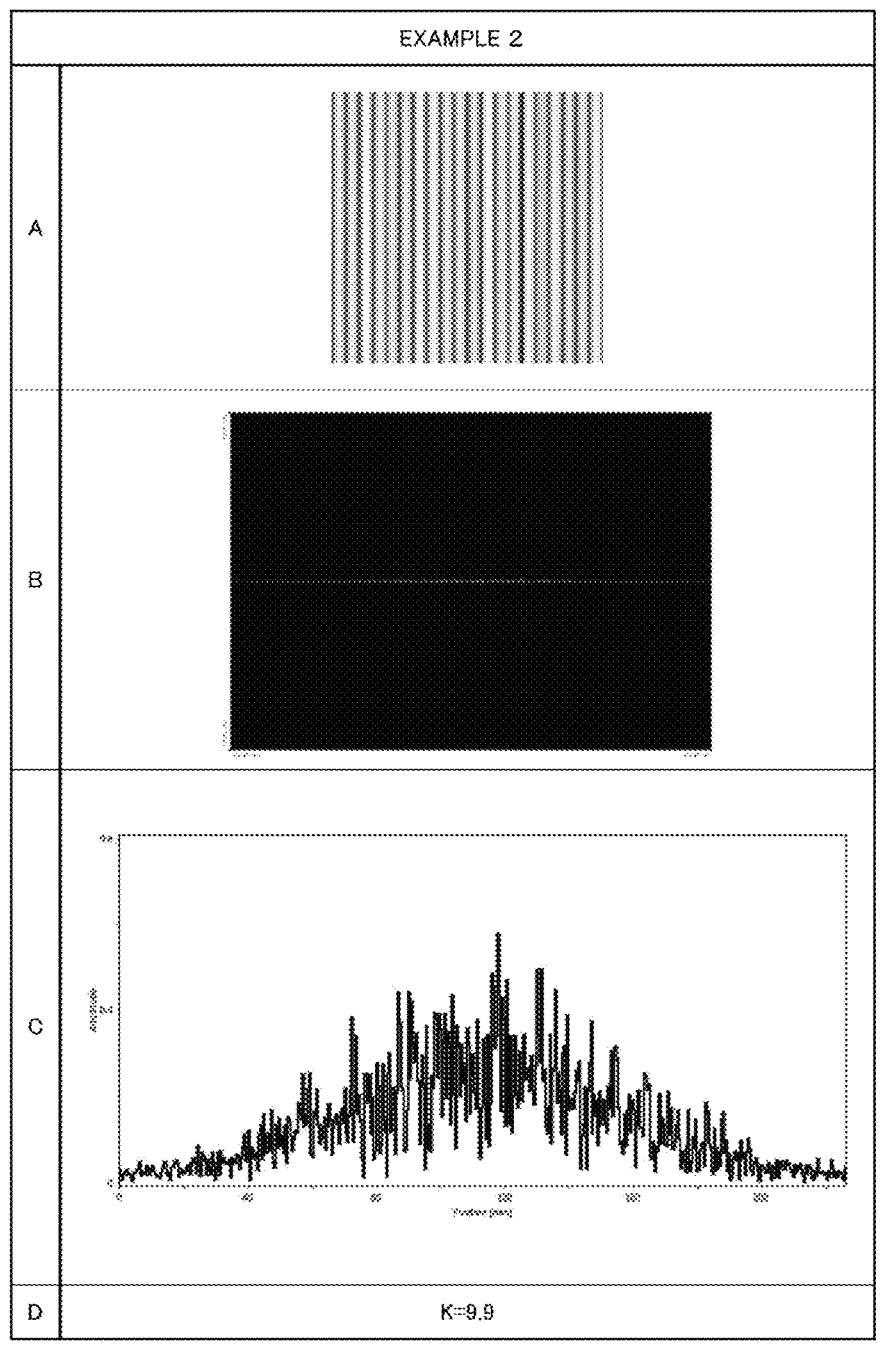
FIG. 19 shows explanatory diagrams concerning a diffusion plate according to Example 2.
Figure 20:
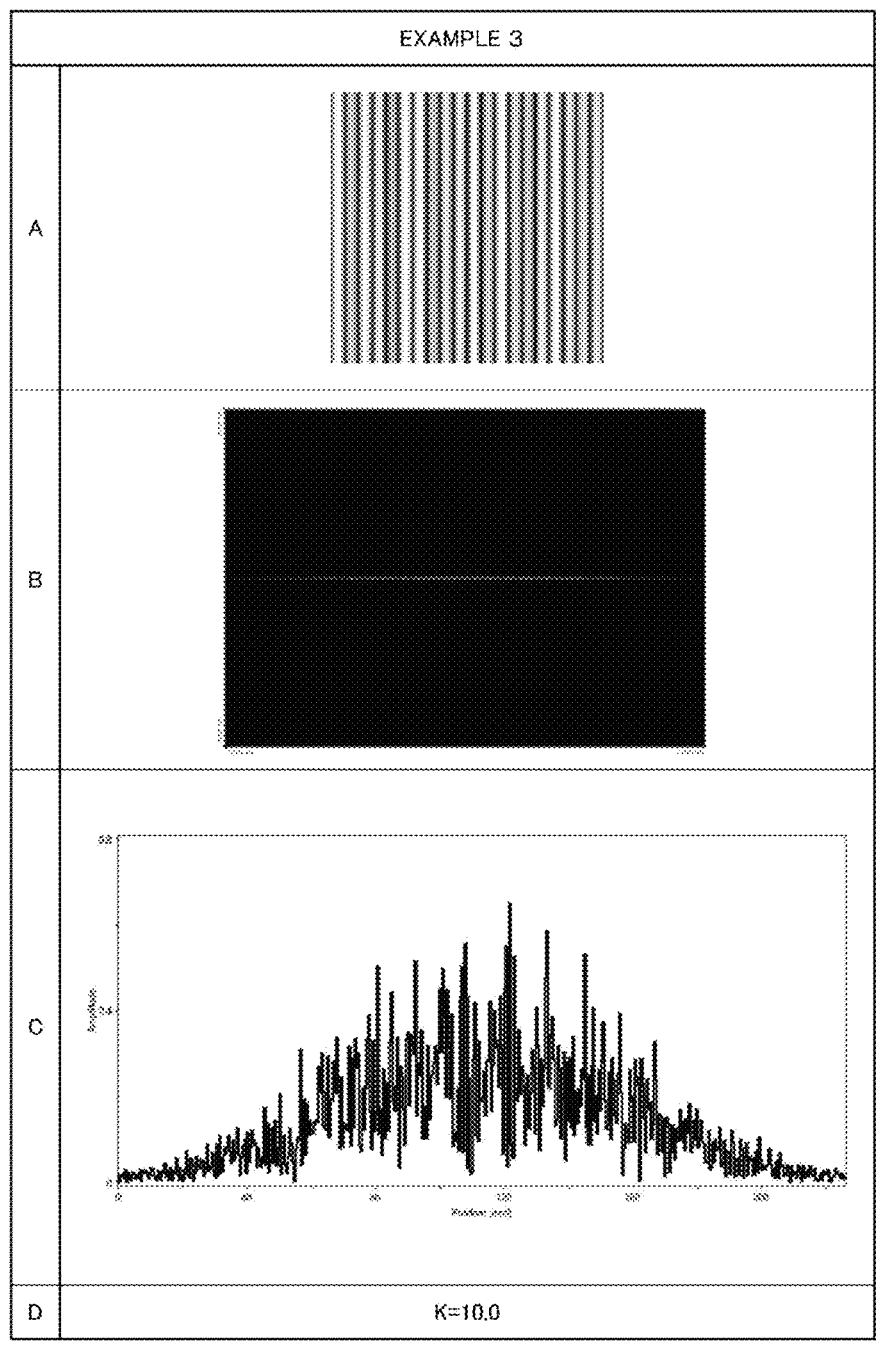
FIG. 20 shows explanatory diagrams concerning a diffusion plate according to Example 3.
Figure 21:
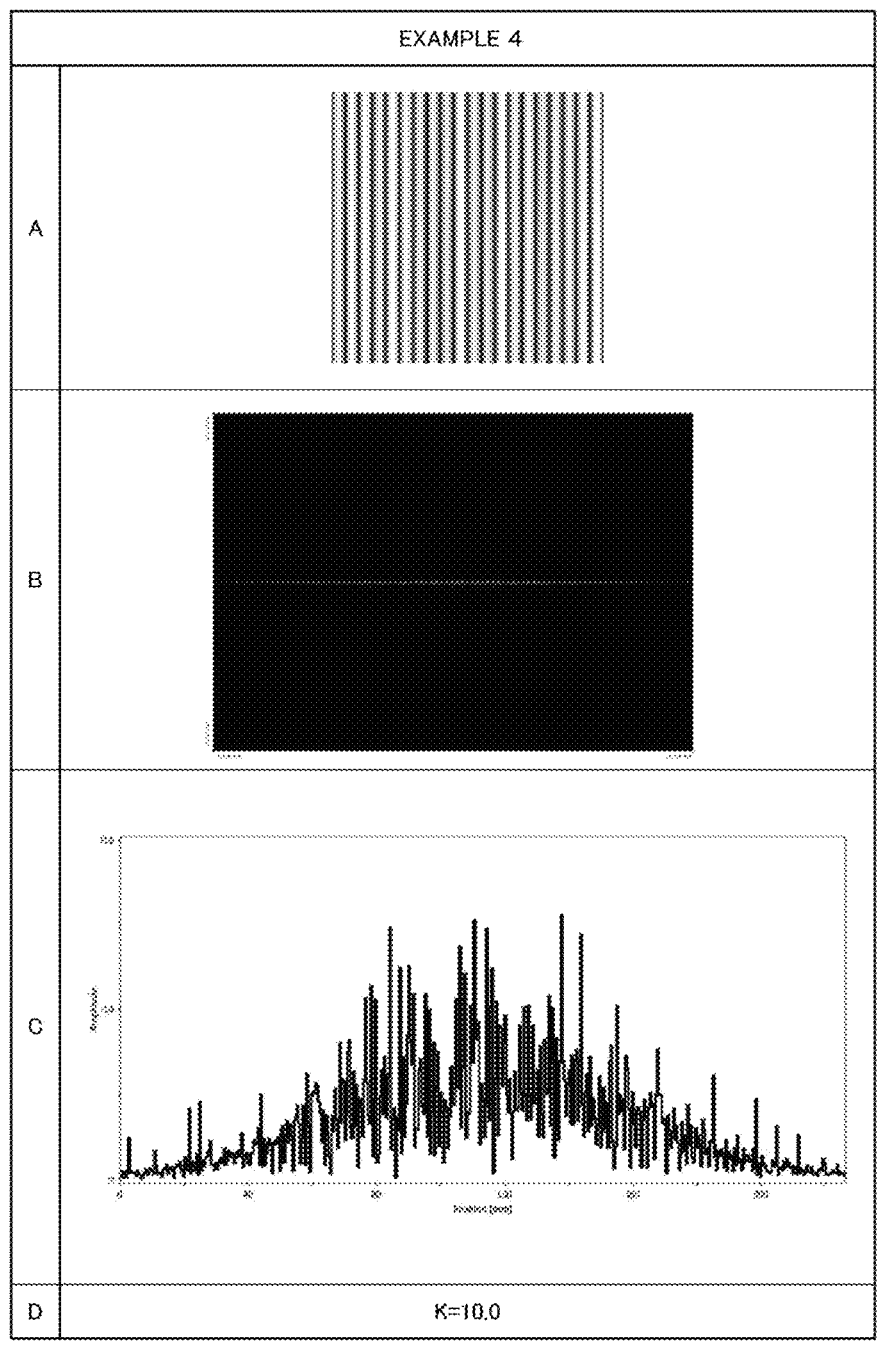
FIG. 21 shows explanatory diagrams concerning a diffusion plate according to Example 4.
Figure 22:
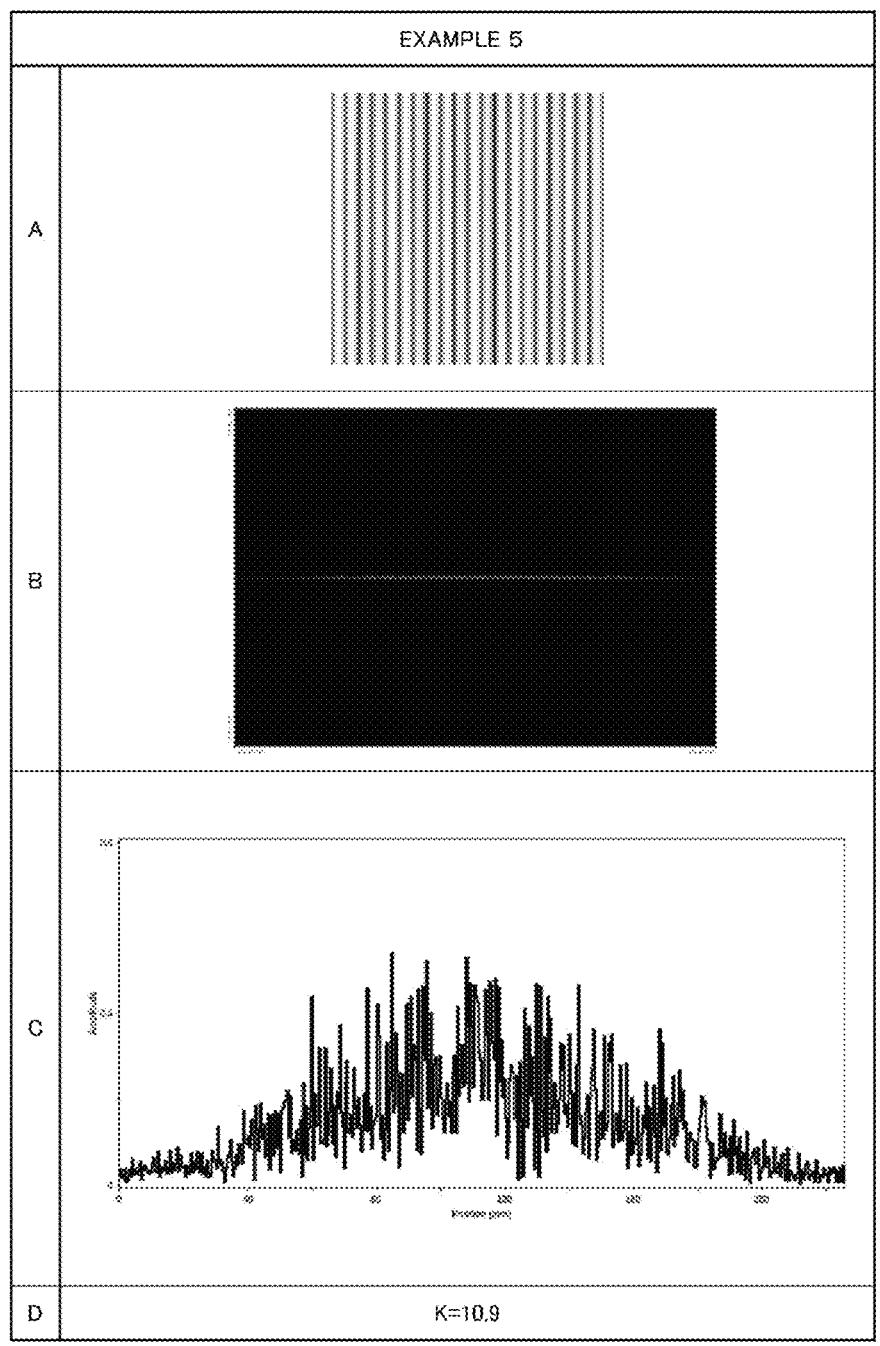
FIG. 22 shows explanatory diagrams concerning a diffusion plate according to Example 5.
Figure 23:
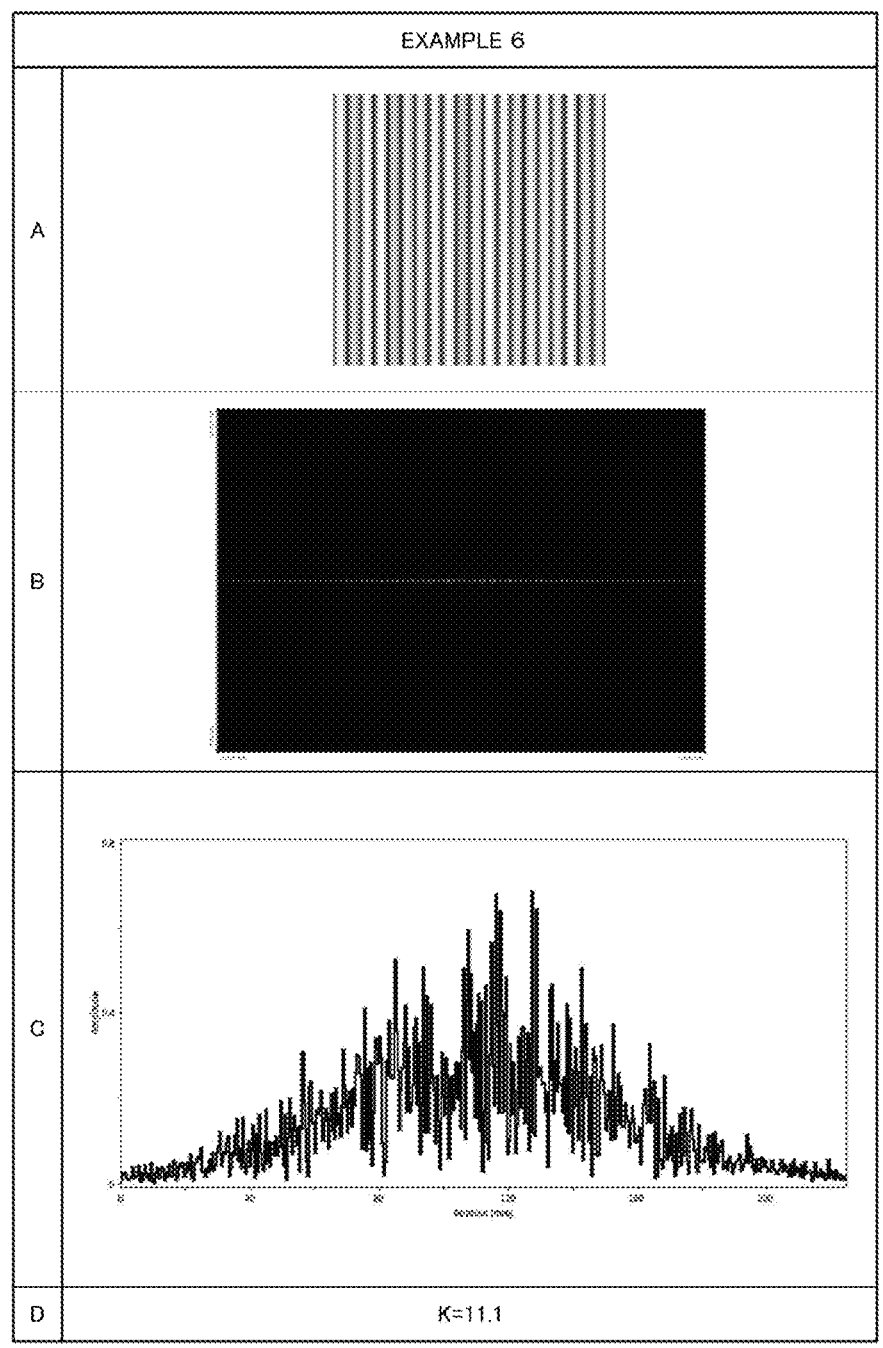
FIG. 23 shows explanatory diagrams concerning a diffusion plate according to Example 6.
Figure 24:
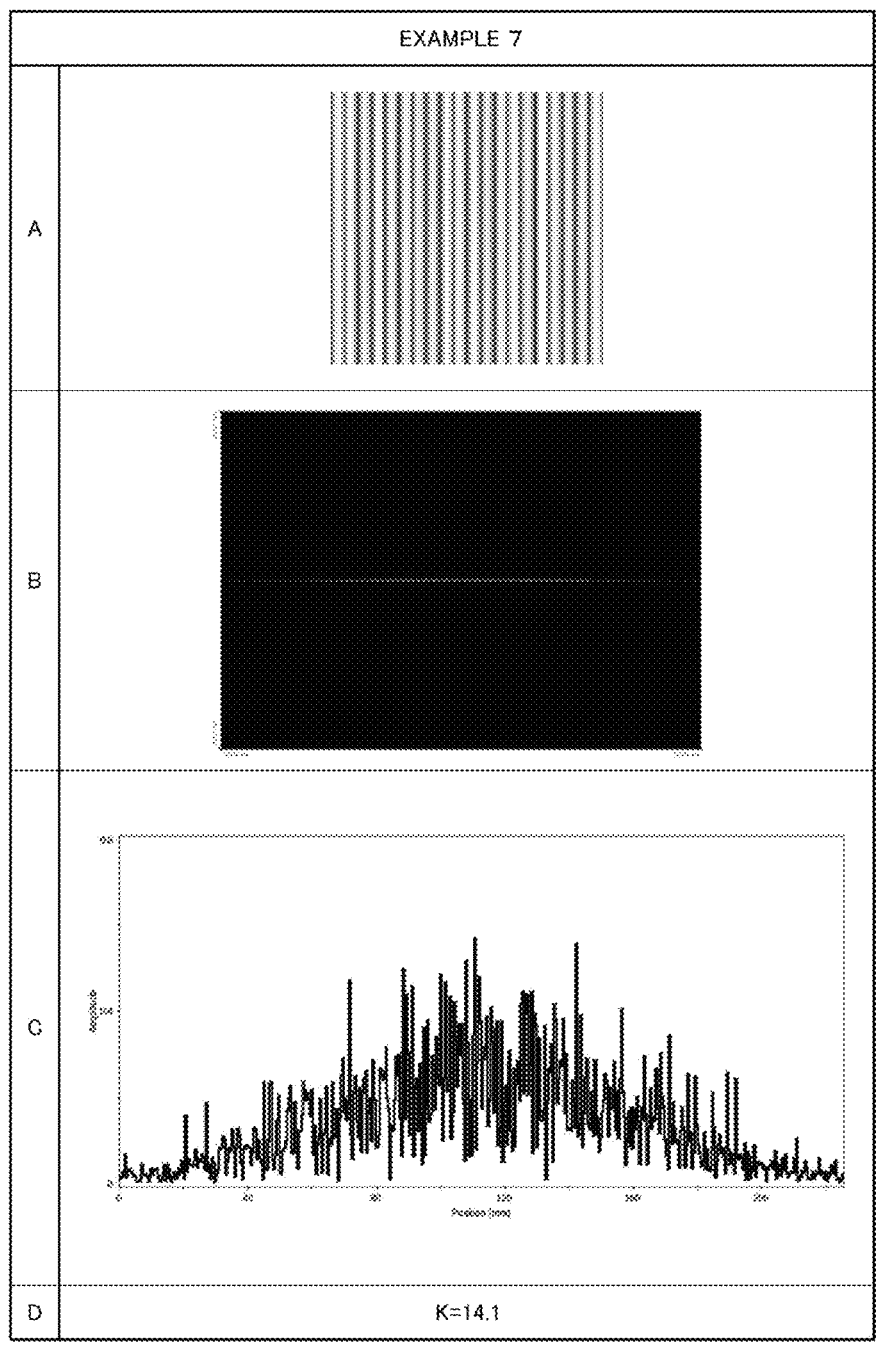
FIG. 24 shows explanatory diagrams concerning a diffusion plate according to Example 7.
Figure 25:
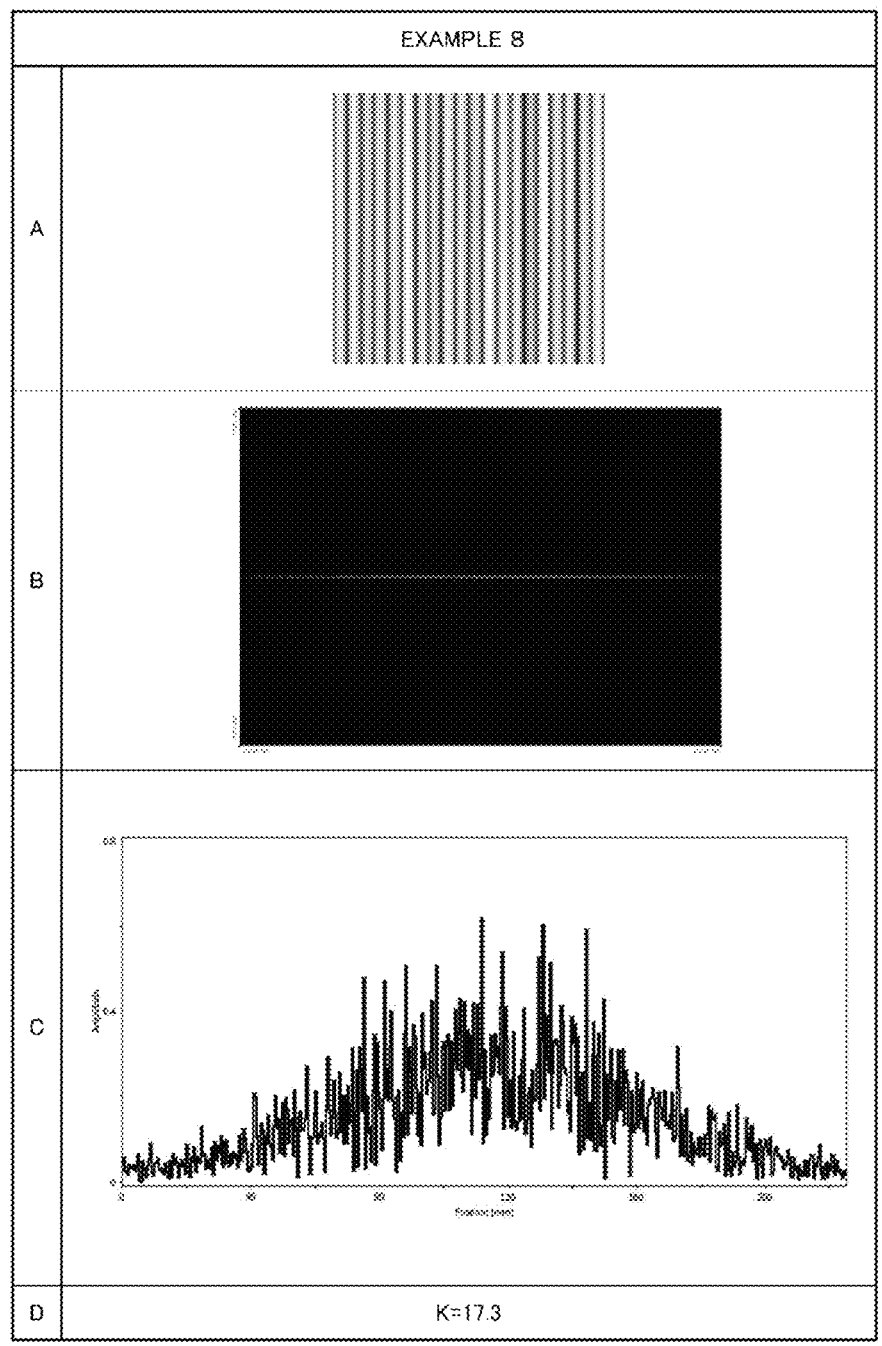
FIG. 25 shows explanatory diagrams concerning a diffusion plate according to Example 8.
Figure 26:
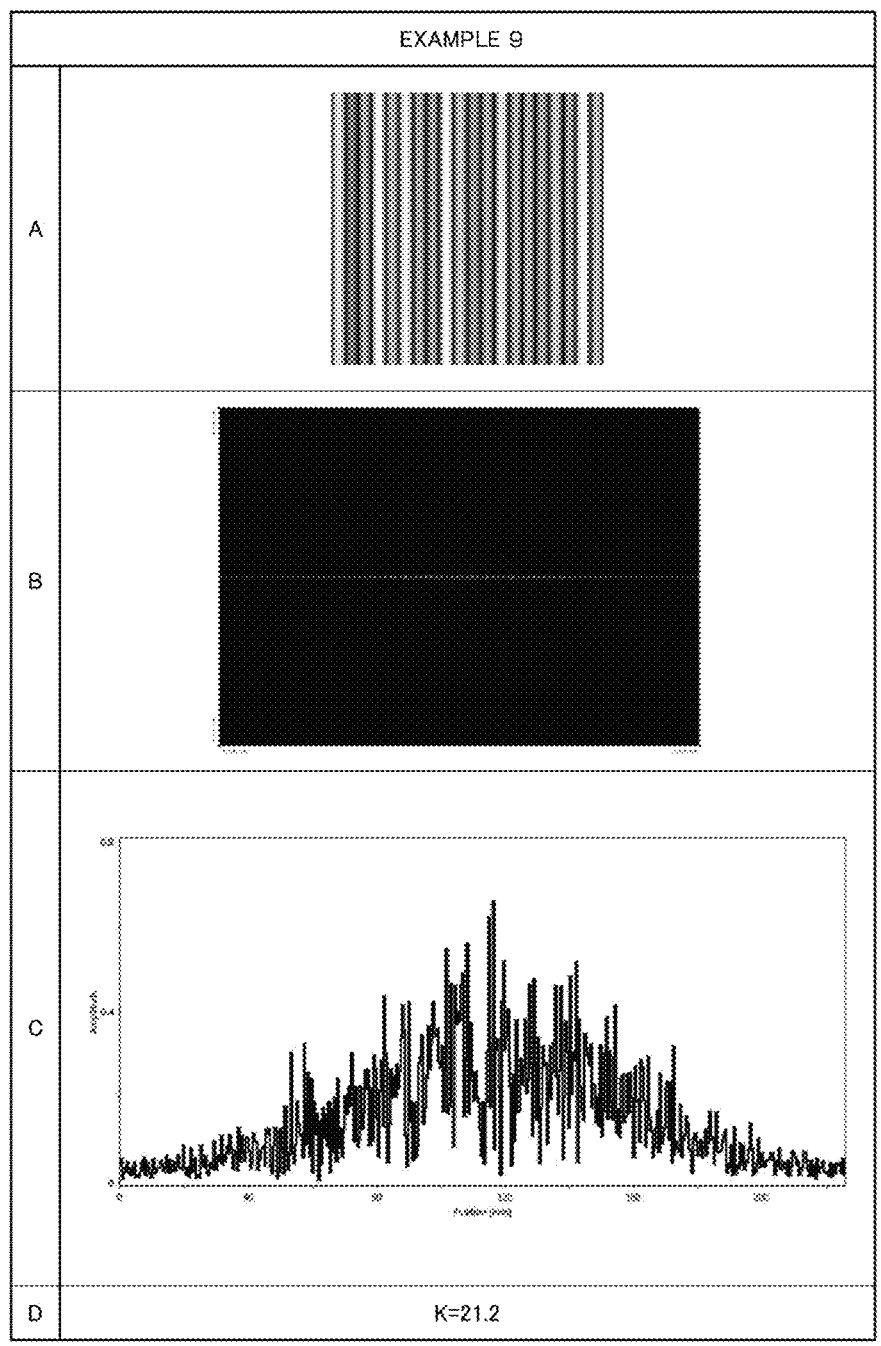
FIG. 26 shows explanatory diagrams concerning a diffusion plate according to Example 9.
Figure 27:
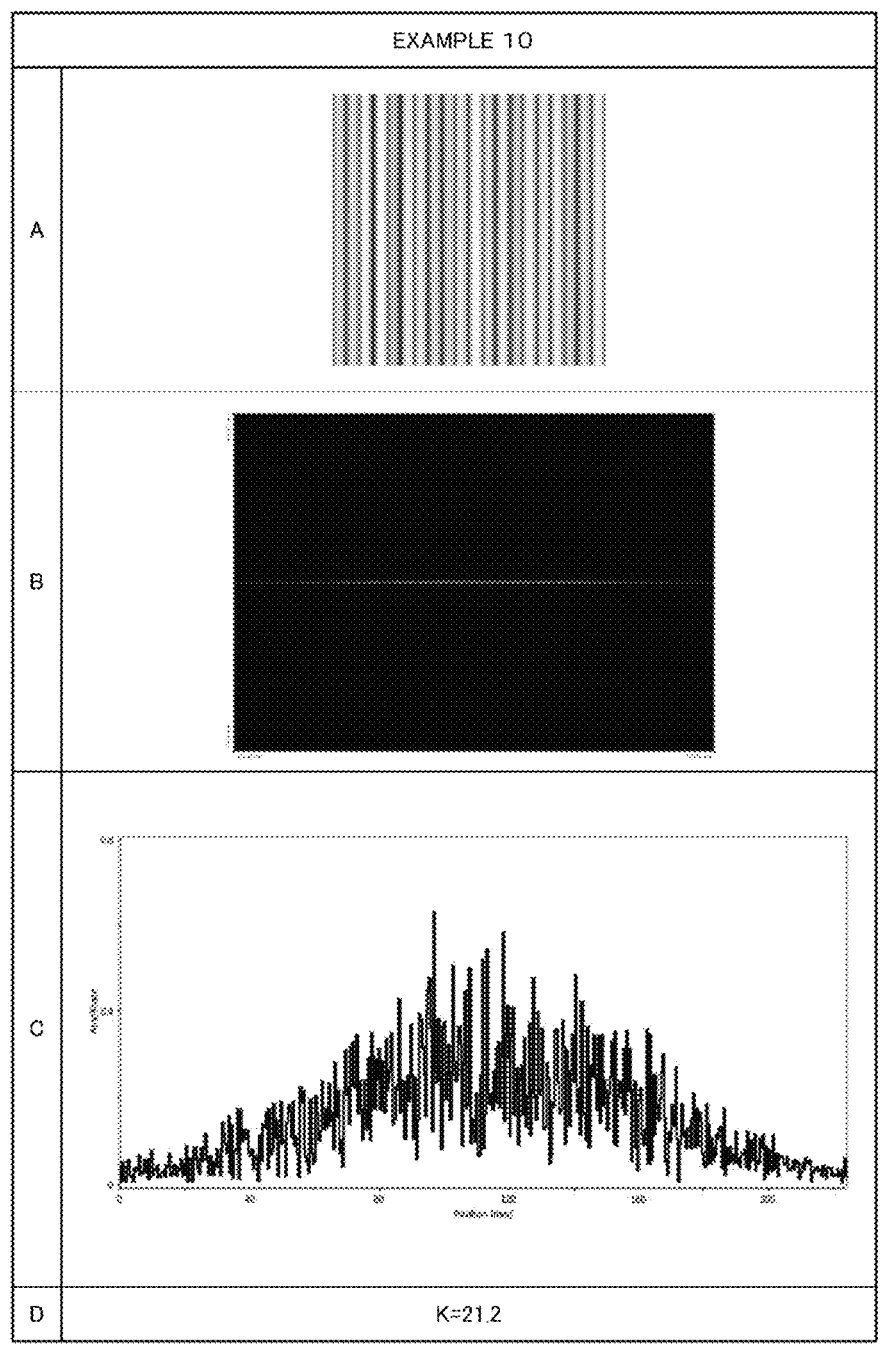
FIG. 27 shows explanatory diagrams concerning a diffusion plate according to Example 10.
Figure 28:
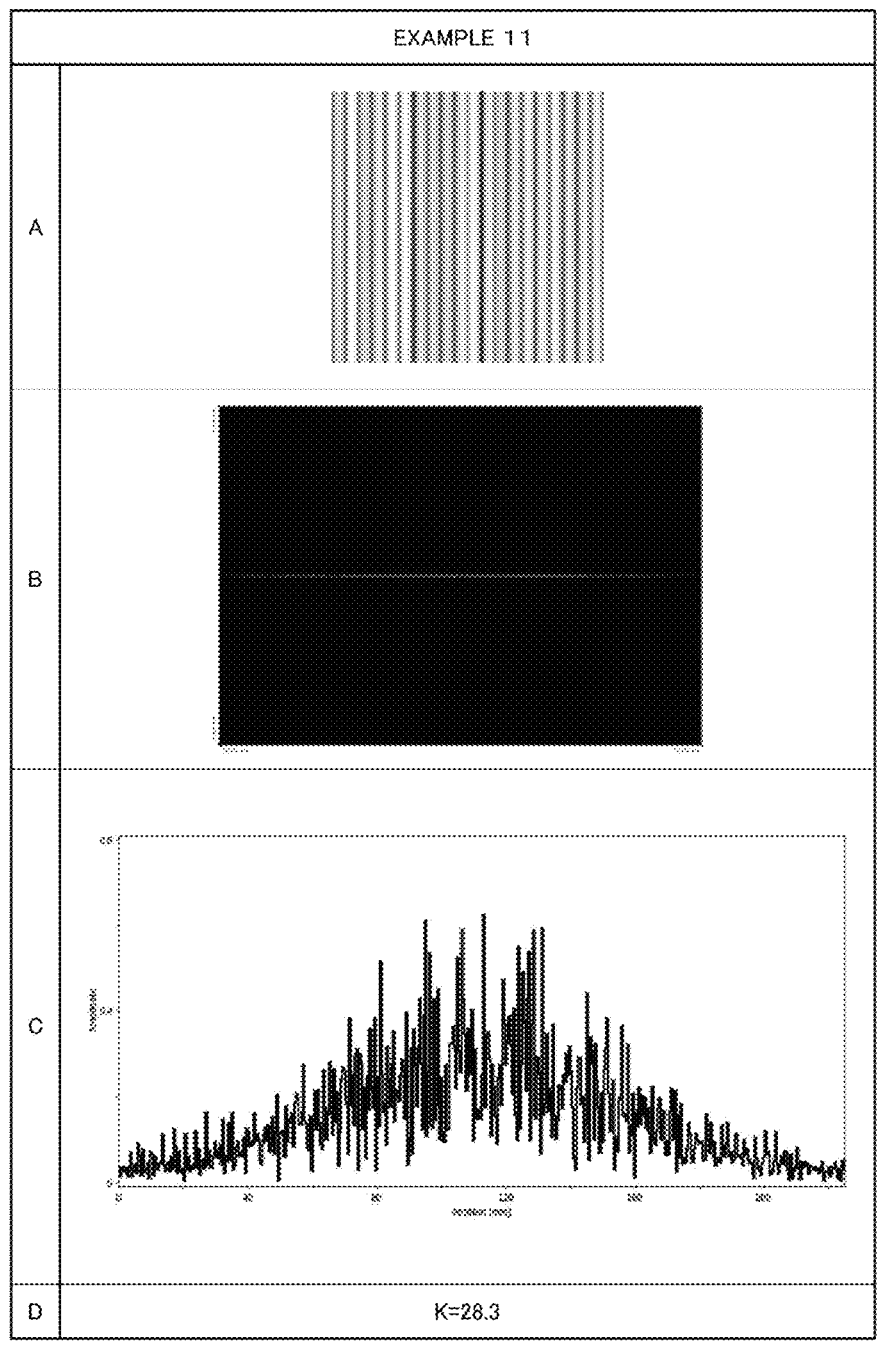
FIG. 28 shows explanatory diagrams concerning a diffusion plate according to Example 11.
Figure 29:
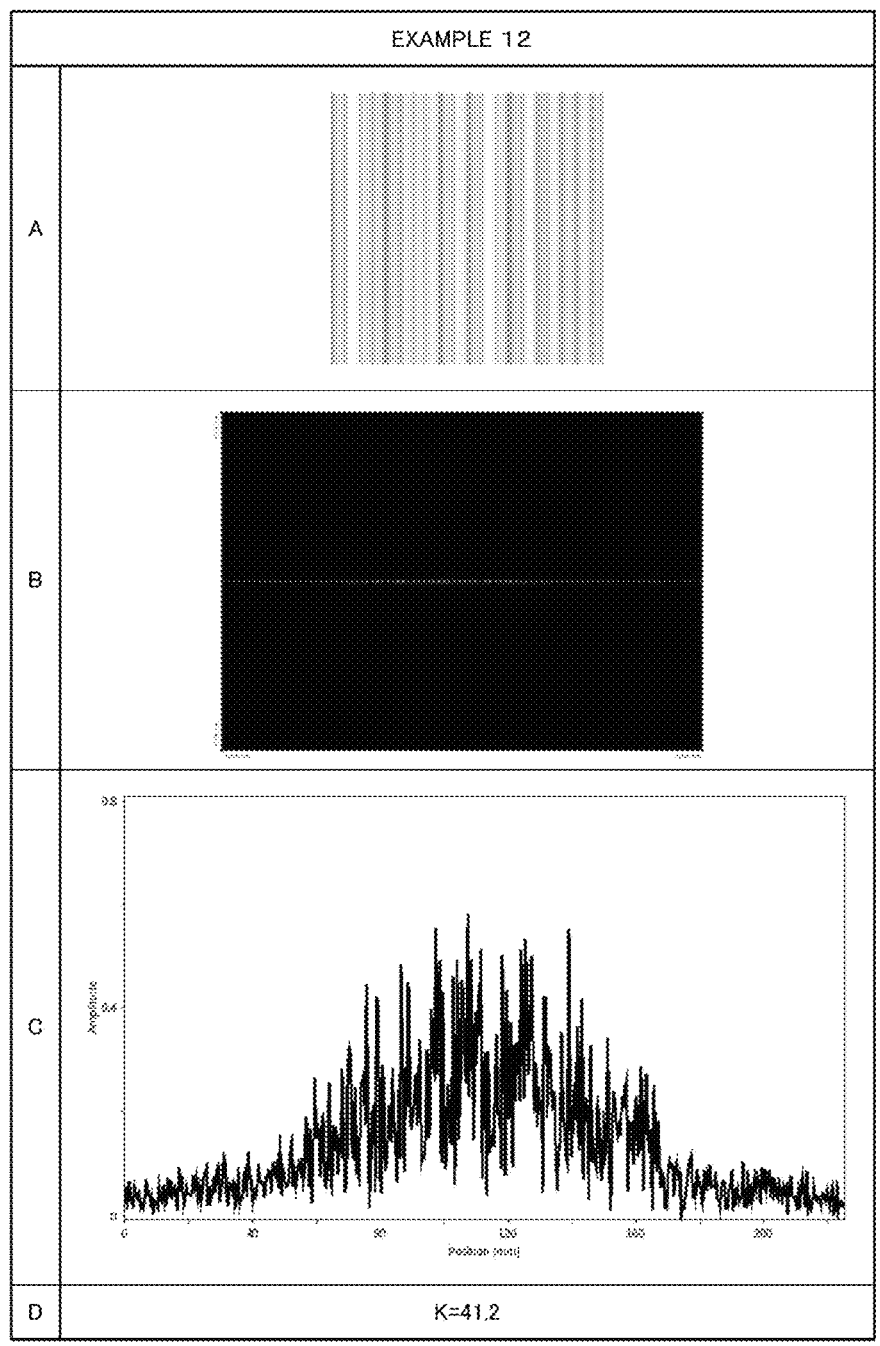
FIG. 29 shows explanatory diagrams concerning a diffusion plate according to Example 12.
Figure 30:
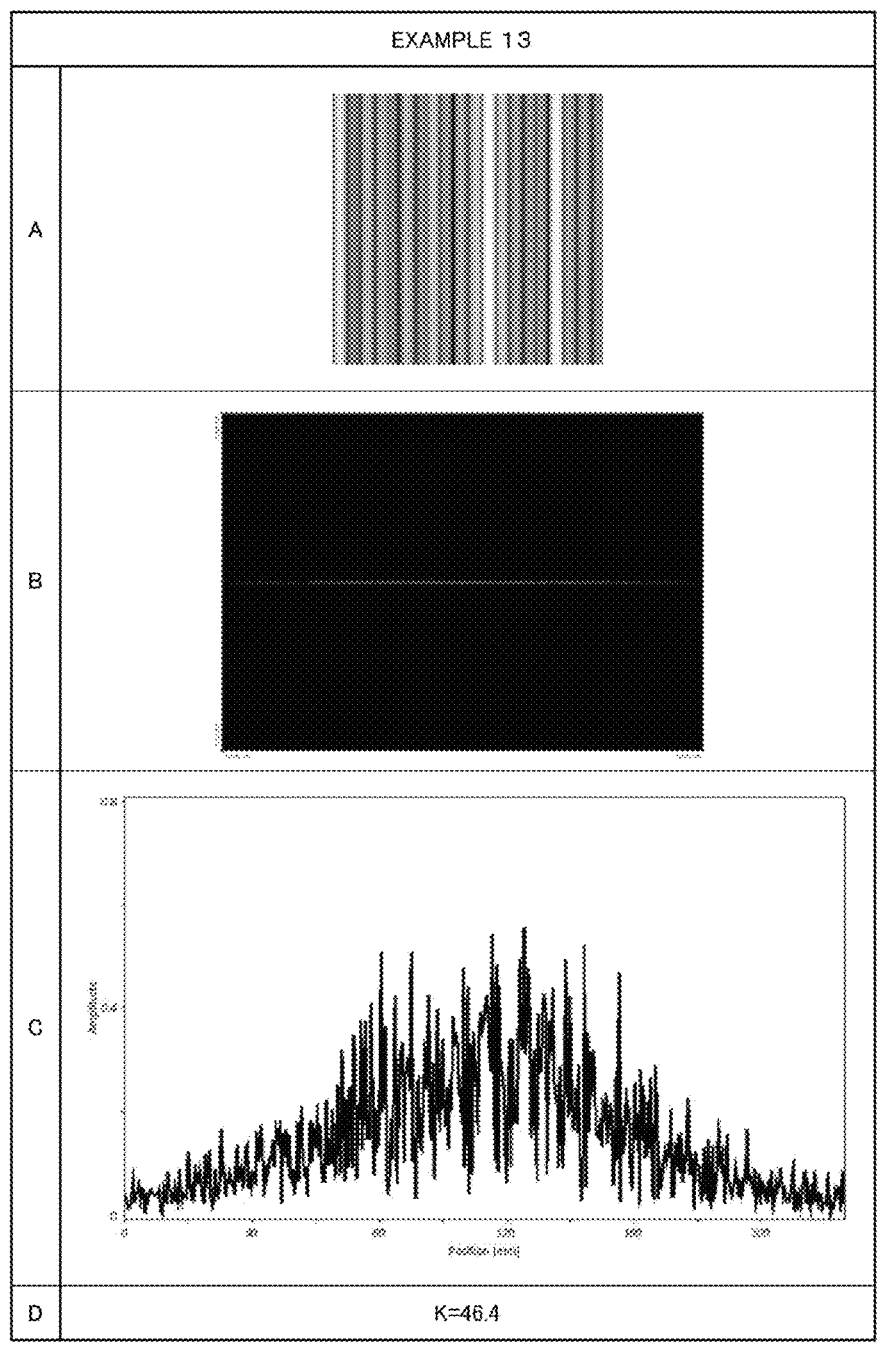
FIG. 30 shows explanatory diagrams concerning a diffusion plate according to Example 13.
Figure 31:
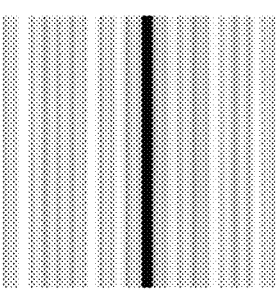
FIG. 31 shows explanatory diagrams concerning a diffusion plate according to Reference Example 1.
Figure 32:
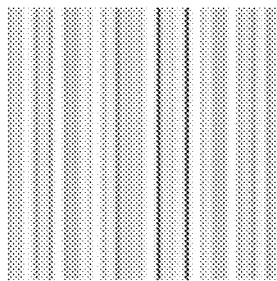
FIG. 32 shows explanatory diagrams concerning a diffusion plate according to Reference Example 2.
Figure 33:
FIG. 33 shows explanatory diagrams concerning a diffusion plate according to Reference Example 3.

Next, a method for manufacturing the diffusion plate 1 according to the present embodiment will be described with reference to FIG. 9. FIG. 9 is a flowchart showing the method for manufacturing the diffusion plate 1 according to the present embodiment.

As shown in FIG. 9, in the method for manufacturing the diffusion plate 1 according to the present embodiment, a base material (a base material of a master original or the base material 10 of the diffusion plate 1) is cleaned first (step S101). The base material may be, for example, a roll-shaped base material such as a glass roll, or may be a planar base material such as a glass wafer or a silicon wafer.

Then, resist is formed on a surface of the base material after cleaning (step S103). A resist layer can be formed of resist in which a metal oxide is used, for example. Specifically, on a roll-shaped base material, the resist layer can be formed by subjecting resist to spray coating or dipping treatment. On the other hand, on a planar base material, the resist layer can be formed by subjecting resist to any type of coating processing. Note that, as the resist, a positive-type photoreactive resist may be used, or a negative-type photoreactive resist may be used. In addition, a coupling agent may be used for increasing adhesion between the base material and the resist.

Further, the resist layer is exposed using a pattern corresponding to the shape of the microlens array 20 (step S105). For such exposure processing, a publicly-known exposure method such as, for example, exposure through use of a gray scale mask, multiple exposure with a plurality of gray scale masks overlapped, or laser exposure through use of a picosecond pulsed laser, a femtosecond pulsed laser, or the like should be applied as appropriate.

Thereafter, the resist layer after the exposure is developed (S107). Through such development processing, a pattern is formed on the resist layer. The development processing can be executed using an appropriate developing solution depending on the material of the resist layer. In a case in which the resist layer is formed of resist in which a metal oxide is used, for example, the resist layer can be subjected to alkaline development using an inorganic or organic alkaline solution.

Then, sputtering processing or etching processing is performed using the resist layer after the development (S109), thereby completing a master original having the shape of the microlens array 20 formed on its surface (S11). Specifically, a glass master can be manufactured by subjecting a glass base material to glass etching using the resist layer on which the pattern has been formed as a mask. Alternatively, a metal master can be manufactured by subjecting the resist layer on which the pattern has been formed to Ni sputtering or nickel plating (NED treatment) to form a nickel layer to which the pattern has been transferred, and then separating the base material. The metal master original can be manufactured by forming a nickel layer to which the pattern of the resist has been transferred by, for example, Ni sputtering to a film thickness of approximately 50 nm, nickel plating (for example, sulfamate Ni bath) to a film thickness of 100 μm to 200 μm, or the like.

Further, the pattern is transferred (imprinted) to a resin film or the like using the master original (for example, a glass master original or a metal master original) completed in the above-described S111, thereby creating a soft mold having an inverted shape of the microlens array 20 formed on its surface (S113).

Thereafter, the pattern of the microlens array 20 is transferred to the glass substrate, the film base material, or the like using the soft mold (S115), and a protection film, an antireflection film, and the like are deposited further according to necessity (S117), thereby manufacturing the diffusion plate 1 according to the present embodiment.

Note that the foregoing has described the example of manufacturing the soft mold (S113) using the master original (Sill) and then manufacturing the diffusion plate 1 (S115) by transfer using the soft mold. However, this is not a limitative example, and a master original (for example, an inorganic glass master original) having an inverted shape of the microlens array 20 formed thereon may be manufactured, and the diffusion plate 1 may be manufactured by imprinting using the master original. For example, the diffusion plate 1 can be manufactured by coating a base material made of PET (PolyEthylene Terephthalate) or PC (PolyCarbonate) with an acrylic light curing resin, transferring the pattern of the master original to the coated acrylic light curing resin, and UV-curing the acrylic light curing resin.

On the other hand, in a case of directly processing the glass base material itself to manufacture the diffusion plate 1, the diffusion plate 1 according to the present embodiment is manufactured by subjecting the base material 10 to dry etching processing (S119) using a publicly-known component such as $CF_4$ subsequent to the development processing in step S107, and thereafter depositing (S121) a protection film, an antireflection film, and the like according to necessity.

Note that the manufacturing method shown in FIG. 9 is merely an example, and the method for manufacturing a diffusion plate is not limited to the above-described example. The diffusion plate can also be manufactured using a precision machining technology, for example. In this case, a microlens structure having a surface shape in which a plurality of cylindrical lenses as described above are arranged may be formed by subjecting the surface of the master original or the base material of the diffusion plate to cutting machining using cutting blades such as a plurality of types of diamond turning tools having different shapes.

8. Application Examples of Diffusion Plate 1

Next, application examples of the diffusion plate 1 according to the present embodiment will be described.

The diffusion plate 1 as described above can be mounted as appropriate on a device that requires light diffusion in order to achieve its function. Examples of such a device can include a display device such as various displays (a LED and an organic EL display, for example), a projection device such as a projector, and various lighting devices.

For example, the diffusion plate 1 can also be applied to a backlight of a liquid crystal display device, a diffusion plate-integrated lens, or the like, and can also be applied to a light shaping application. In addition, the diffusion plate 1 can also be applied to a transmission screen, a Fresnel lens, a reflection screen, or the like of a projection device. In addition, the diffusion plate 1 can also be applied to various lighting devices to be utilized for spot illumination, base illumination, or the like, various special lightings, various screens such as an intermediate screen or a final screen, and the like. Further, the diffusion plate 1 can also be applied to an application such as diffusion control over light source light in an optical device, and can also be applied to light distribution control in a LED light source device, light distribution control in a laser light source device, incident light distribution control over various light bulb systems, and the like.

In addition, the diffusion plate 1 can be applied to a remote sensing light source. For example, the diffusion plate 1 can be applied to a remote sensing technology through use of light such as LIDAR (Light Detection and Ranging), light distribution control in sensing light sources of various industrial or consumer robot apparatuses, and the like.

Note that a device to which the diffusion plate 1 is applied is not limited to the above-described application examples, and can also be applied to any publicly-known device that utilizes light diffusion.

EXAMPLES

9. Examples

Next, diffusion plates according to examples of the present invention will be described. Note that the following examples are mere examples for indicating effects and practicability of the diffusion plate according to the present invention, and the present invention is not limited to the following examples.

9.1. Design Conditions for Diffusion Plate

Diffusion plates according to the examples of the present invention, comparative examples, and reference examples were manufactured by a manufacturing method which will be described below while changing the surface structure of the microlens array.

Specifically, first, one (a principal surface) of surfaces of a glass base material was coated with a photoreactive resist to a resist thickness of 2 μm to 18 μm after cleaning the glass base material. As the photoreactive resist, a positive-type photoreactive resist such as PMER-LA900 (made by TOKYO OHKA KOGYO CO., LTD.) or AZ4620 (registered trademark) (made by AZ Electronic Materials) was used, for example.

Next, a pattern was drawn on the resist on the glass base material by a laser drawing device through use of laser having a wavelength of 405 nm to expose the resist layer. Note that the resist layer may be exposed by subjecting the resist on the glass base material to mask exposure in a step-and-repeat exposure device through use of g-rays.

Subsequently, the resist layer was developed to form a pattern on the resist. As the developing solution, a solution of tetramethylammonium hydroxide (TMAH) such as NMD-W (made by TOKYO OHKA KOGYO CO., LTD.) or PMER P7G (made by TOKYO OHKA KOGYO CO., LTD.) was used, for example.

Next, the glass base material was etched using the resist with the pattern formed thereon, thereby manufacturing a diffusion plate. Specifically, the diffusion plate was manufactured by forming the pattern of the resist on the glass base material by glass etching using Ar gas or $CF_4$ gas.

Table 1 relates to diffusion plates according to the examples, comparative examples, and reference examples manufactured as described above, and shows design conditions for surface structures of microlens arrays, as well as evaluation results of light distribution properties and homogeneity of linear diffusion light achieved by the diffusion plates.

TABLE 1

| | Conditions | | | | | | | | | | | Evaluations | | |
|---|---|---|---|---|---|---|---|---|---|---|---|---|---|---|
| No. | Dk (um) | δD (%) | Rk (um) | δR (%) | δEc (%) | Zmax (um) | Left side of Ex (1) K | Ex (1) K ≥ 9 | δD ≠ 0 or δR ≠ 0 | Ex (2) K ≥ 14 | Ex (3) K < 46.9 and δEc ≤ 30 | Light Distribution Properties | Homogeneity | Overall Evaluation |
| Comparative Example 1 | 40 | 0 | 25 | 0 | 0 | 10.0 | 0.0 | n/a | n/a | n/a | ✓ | C | C | D |
| Comparative Example 2 | 40 | 3 | 25 | 3 | 0 | 10.6 | 4.2 | n/a | ✓ | n/a | ✓ | C | C | D |
| Comparative Example 3 | 40 | 3 | 25 | 3 | 3 | 11.6 | 5.2 | n/a | ✓ | n/a | ✓ | C | C | D |
| Comparative Example 4 | 40 | 5 | 25 | 5 | 0 | 11.3 | 7.1 | n/a | ✓ | n/a | ✓ | C | C | D |
| Comparative Example 5 | 40 | 0 | 25 | 5 | 5 | 11.5 | 7.1 | n/a | ✓ | n/a | ✓ | C | C | D |
| Comparative Example 6 | 40 | 3 | 25 | 3 | 7 | 13.2 | 8.2 | n/a | ✓ | n/a | ✓ | C | C | D |
| Comparative Example 7 | 40 | 5 | 25 | 5 | 5 | 12.8 | 8.7 | n/a | ✓ | n/a | ✓ | C | C | D |
| Comparative Example 8 | 40 | 0 | 25 | 0 | 10 | 12.4 | 10.0 | ✓ | n/a | n/a | ✓ | C | B | D |
| Example 1 | 40 | 7 | 25 | 7 | 0 | 10.9 | 9.9 | ✓ | ✓ | n/a | ✓ | B | B | C |
| Example 2 | 40 | 5 | 25 | 5 | 7 | 13.7 | 9.9 | ✓ | ✓ | n/a | ✓ | B | B | C |
| Example 3 | 40 | 10 | 25 | 0 | 0 | 11.3 | 10.0 | ✓ | ✓ | n/a | ✓ | B | B | C |
| Example 4 | 40 | 0 | 25 | 10 | 0 | 10.9 | 10.0 | ✓ | ✓ | n/a | ✓ | B | B | C |
| Example 5 | 40 | 3 | 25 | 3 | 10 | 13.3 | 10.9 | ✓ | ✓ | n/a | ✓ | B | B | C |
| Example 6 | 40 | 7 | 25 | 7 | 5 | 12.4 | 11.1 | ✓ | ✓ | n/a | ✓ | B | B | C |
| Example 7 | 40 | 0 | 25 | 10 | 10 | 13.7 | 14.1 | ✓ | ✓ | ✓ | ✓ | A | A | A |
| Example 8 | 40 | 10 | 25 | 10 | 10 | 14.5 | 17.3 | ✓ | ✓ | ✓ | ✓ | A | A | A |
| Example 9 | 40 | 15 | 25 | 15 | 0 | 13.8 | 21.2 | ✓ | ✓ | ✓ | ✓ | B | A | B |
| Example 10 | 40 | 15 | 25 | 0 | 15 | 16.8 | 21.2 | ✓ | ✓ | ✓ | ✓ | A | A | A |
| Example 11 | 40 | 0 | 25 | 20 | 20 | 17.6 | 28.3 | ✓ | ✓ | ✓ | ✓ | A | B | B |
| Example 12 | 40 | 20 | 25 | 20 | 30 | 56.8 | 41.2 | ✓ | ✓ | ✓ | ✓ | A | B | B |
| Example 13 | 40 | 25 | 25 | 25 | 30 | 25.5 | 46.4 | ✓ | ✓ | ✓ | ✓ | A | A | A |
| Reference Example 1 | 40 | 30 | 25 | 30 | 20 | 56.6 | 46.9 | — | — | — | n/a | — | — | E |
| Reference Example 2 | 40 | 30 | 25 | 30 | 30 | 56.0 | 52.0 | — | — | — | n/a | — | — | E |
| Reference Example 3 | 40 | 15 | 25 | 15 | 35 | 54.1 | 40.9 | — | — | — | n/a | — | — | E |

In each of the examples, comparative examples, and reference examples shown in Table 1, the microlens array 20 was designed by the method for locating the microlenses according to the present embodiment described above. On this occasion, various parameters such as lens parameters (Dk, Rk, δD, δR, δEc, and Zmax) shown in Table 1 were changed as appropriate to generate surface shape patterns of microlenses (cylindrical lenses) different from one another. Then, a lens pattern representing the shapes and location of the microlenses (cylindrical lenses) according to each of the examples, comparative examples, and reference examples was output. Using this lens pattern, the diffusion plate according to each of the examples, comparative examples, and reference examples was manufactured by the above-described manufacturing method.

Specifically, the aperture width D in the X direction of the cylindrical lenses (microlenses) was set at a fixed value or a random variable value in each of the examples, comparative examples, and reference examples as shown in Table 1. The case in which the variation full width rate δD=0% means that the aperture width D of all the cylindrical lenses was set at the reference aperture width Dk (fixed value) without varying the aperture width D of each of the cylindrical lenses. On the other hand, the case in which the variation full width rate δD≠0% means that the aperture width D of each of the cylindrical lenses was randomly varied within the variation range defined by the δD using the reference aperture width Dk as a reference as indicated by the following expression, for example.

$$D[\mu m]=Dk[\mu m]+(Dk[\mu m]\times \pm(\delta D/2)[\%])$$

Similarly, the radius of curvature R in the X direction of the cylindrical lenses 21 was set at a fixed value or a random variable value in each of the examples, comparative examples, and reference examples as shown in Table 1. The case in which the variation full width rate δR=0% means that the radius of curvature R of all the cylindrical lenses was set at the reference radius of curvature Rk (fixed value) without varying the radius of curvature R of each of the cylindrical lenses. On the other hand, the case in which the variation full width rate δR≠0% means that the radius of curvature R of each of the cylindrical lenses was randomly varied within the variation range defined by the δR using the reference radius of curvature Rk as a reference as indicated by the following expression, for example.

$$R[\mu m]=Rk[\mu m]+(Rk[\mu m]\times \pm(\delta R/2)[\%])$$

In addition, as to the off-center amount of the lens vertex position 22, the case in which the variation full width rate δEc=0% means that the off-center amount Ec was set at 0 μm (the reference off-center amount Eck) without off-centering the lens vertex positions 22 of all the cylindrical lenses. On the other hand, the case in which the variation full width rate δEc≠0% means that the off-center amount Ec of the lens vertex position 22 of each of the cylindrical lenses was randomly off-centered in the positive and negative directions of the X direction within the variation range defined by the δEc as indicated by the following expression, for example.

$$Ec[\mu m]=0\ [\mu m]+(Dk[\mu m]\times \pm(\delta Ec/2)[\%])$$

Herein, in Examples 1 to 13, the root sum square K of δD, δR, and δEc was more than or equal to 9 (specifically, K≥9.9), which satisfied the condition of Expression (1) above, and K was less than 46.9 (specifically, K≤46.4), which also satisfied the condition of Expression (3) above, and the condition that "δEc≤30%" was also satisfied. Further, in Examples 7 to 13, K was more than or equal to 14 (specifically, K≥14.1), which also satisfied the condition of Expression (2) above.

In contrast to this, in Comparative Examples 1 to 7, K was less than 9, which did not satisfy the condition of Expression (1) above. In addition, in Comparative Example 8, K=10, which satisfied the condition of Expression (1), but δD=0 and δR=0 held. Consequently, Comparative Example 8 did not satisfy the requirement for the microlens array 20 according to the present embodiment (the requirement that at least either δD or δR is not 0% (δD≠0 or δR≠0)). In addition, in Reference Examples 1 and 2, K was more than or equal to 46.9, which did not satisfy the condition of Expression (3), and in Reference Example 3, δEc was 35%, which did not satisfy the condition that "δEc≤30%". Surface shapes of microlens arrays in the diffusion plates according to Examples 1 to 13, Comparative Examples 1 to 8, and Reference Examples 1 to 3 manufactured as described above were observed with a confocal laser microscope. Further, a light distribution pattern of each of the diffusion plates was simulated with Virtual-Lab (made by LightTrans GmbH), and light distribution properties of each of the diffusion plates were measured with light distribution property measuring equipment, Mini-Diff (made by Light Tec).

Surface shape patterns and simulation results of light distribution properties of diffusion light, luminance distributions, and the like of the microlens arrays of the diffusion plates according to Examples 1 to 13, Comparative Examples 1 to 8, and Reference Examples 1 to 3 are respectively shown in FIG. 10 to FIG. 33.

In FIG. 10 to FIG. 33 (Examples 1 to 13, Comparative Examples 1 to 8, and Reference Examples 1 to 3), a confocal laser microscope image (magnification: 50×) showing the surface shape pattern of the microlens array is denoted by (A). An image showing a simulation result of light distribution obtained by an electromagnetic field analysis is denoted by (B). A graph showing a simulation result of luminance distribution of diffusion light is denoted by (C) (horizontal axis: a coordinate position [mm] in the X direction on a projected image 100 mm ahead of the diffusion plate (in the Z direction); vertical axis: amplitude of an electric field (field intensity [V/m]) representing the luminance level of diffusion light). The value of the root sum square K of δD, δR, and δEc described above is denoted by (D).

9.2. Evaluation Criteria for Diffusion Plates (1) Evaluation Criteria for Light Distribution Properties As to the light distribution properties of linear diffusion light achieved by the diffusion plate according to each of the examples and comparative examples, the degree of reduction of zero-order diffraction light (noise) was evaluated in three levels (evaluations A, B, and C) in line with the following evaluation criteria. Evaluation results of the light distribution properties are shown in Table 1 above.

Evaluation A: Zero-order diffraction light was obviously reduced.

Evaluation B: Occurrence of zero-order diffraction light was not obvious.

Evaluation C: Zero-order diffraction light having a high intensity or zero-order diffraction light having a luminance distribution with a core obviously occurred.

Herein, the "zero-order diffraction light having a high intensity" is zero-order diffraction light having a luminance level peak of more than or equal to 0.8 [V/m] or close to 0.8 [V/m], as shown in the graphs (C) in FIG. 10 to FIG. 13 and FIG. 17 (Comparative Examples 1 to 4 and 8), for example. In addition, the "zero-order diffraction light having a luminance distribution with a core" is zero-order diffraction light having a luminance level peak of less than 0.8 [V/m], but having a wide luminance distribution in the X direction, as shown in the graphs (C) in FIG. 14 to FIG. 16 (Comparative Examples 5 to 7), for example.

The zero-order diffraction light (including a bright line spectrum) emitted from the diffusion plate is noise that inhibits dispersion of light distribution in the X direction. In the graphs of the luminance distribution denoted by (C) in FIG. 10 to FIG. 30, for example, zero-order diffraction light (noise) appeared close to the center of the X coordinate position on the horizontal axis (close to a position of generally 90 to 120 mm) as a peak portion whose luminance level (field intensity [V/m]) on the vertical axis was a high value (around 0.8, for example). If the zero-order diffraction light can be reduced, the light distribution properties in the X direction of the diffusion plate can be improved. The light distribution properties of the diffusion plate according to each of the examples and comparative examples were evaluated depending on the degree in which the zero-order diffraction light (noise) was reduced by varying the surface shapes of the microlenses.

(2) Evaluation Criteria for Homogeneity

As to the homogeneity of linear diffusion light achieved by the diffusion plate according to each of the examples and comparative examples, the degree of reduction of spectral noise included in the diffusion light was evaluated in three levels (evaluations A, B, and C) in line with the following evaluation criteria. Evaluation results of the homogeneity are shown in Table 1 above.

Evaluation A: Spectral noise was homogeneously reduced to a low luminance level of generally less than or equal to 0.5 [V/m].

Evaluation B: Spectral noise having a high intensity whose luminance level was approximately about 0.5 [V/m] was reduced.

Evaluation C: Spectral noise having a high intensity whose luminance level was well over about 0.5 [V/m] occurred.

(3) Overall Evaluation Criteria

Overall evaluation concerning the light distribution properties (the degree of reduction of zero-order diffraction light) and homogeneity (the degree of reduction of spectral noise) of the diffusion plate according to each of the examples and comparative examples was made in five levels (evaluations A to E) in line with the following evaluation criteria. Results of the overall evaluation are shown in Table 1.

Evaluation A: Both the light distribution properties and homogeneity of diffusion light were very good. In other words, neither zero-order diffraction light nor other diffraction light occurred, and spectral noise was homogeneously reduced to a low luminance level of generally less than or equal to 0.5 [V/m].

Evaluation B: Both the light distribution properties and homogeneity of diffusion light were good, and either the light distribution properties or homogeneity was very good. In other words, zero-order diffraction light did not occur (the light distribution properties were very good), or zero-order diffraction light was generally suppressed (the light distribution properties were good). In addition, spectral noise was homogeneously reduced to a low luminance level of generally less than or equal to 0.5 [V/m] (the homogeneity was very good), or spectral noise having a high intensity whose luminance level was approximately about 0.5 [V/m] was reduced (the homogeneity was good).

Evaluation C: Both the light distribution properties and homogeneity of diffusion light were good. In other words, zero-order diffraction light was generally suppressed, and spectral noise having a high intensity whose luminance level was approximately about 0.5 [V/m] was reduced.

Evaluation D: The light distribution properties of diffusion light were insufficient. In other words, zero-order diffraction light whose luminance level was equivalent to more than or equal to 0.8 [V/m] or zero-order diffraction light having a luminance distribution with a core occurred.

Evaluation E: Since the lens surface shape was excessively varied due to an excessive large set value of K or $\delta Ec$, a plurality of cylindrical lenses did not fall within a lens generation region, and missing of the microlens structure occurred. Thus, the physical configuration condition for the microlens array was not satisfied.

9.3. Comparison Between Evaluation Results of Examples, Comparative Examples, and Reference Examples Hereinafter, the evaluation results of Examples 1 to 13, Comparative Examples 1 to 8, and Reference Examples 1 to 3 will be described in comparison.

(A) As to Condition of Expression (1) (K≥9) and Requirement ($\delta D \neq 0$ and/or $\delta R \neq 0$)

As shown in Table 1, Comparative Examples 1 to 7 did not satisfy the condition of Expression (1) (K≥9). As a result, in Comparative Examples 1 to 7, the evaluation of light distribution properties and the evaluation of homogeneity were all evaluated as "C", and the overall evaluation was evaluated as "D".

In addition, Comparative Example 8 did not satisfy the requirement for the microlens array according to the present embodiment (that is, the requirement that at least either $\delta D$ or $\delta R$ is not 0% ($\delta D \neq 0$ and/or $\delta R \neq 0$)), and only the off-center amount Ec was varied without varying the aperture width D and the radius of curvature R. As a result, in Comparative Example 8, the evaluation of light distribution properties was evaluated as "C", and the overall evaluation was evaluated as "D".

In contrast to this, Examples 1 to 13 satisfied the condition of Expression (1) (K 9). Further, Examples 1 to 13 also satisfied the requirement for the microlens array according to the present embodiment ($\delta D \neq 0$ and/or $\delta R \neq 0$), and at least one of the aperture width D and the radius of curvature R was varied. As a result, in Examples 1 to 13, the evaluation of light distribution properties and the evaluation of homogeneity were all evaluated as "B" or "A", and the overall evaluation was evaluated as "A", "B", or "C".

The above results reveal that by satisfying the condition of Expression (1) (K≥9) and satisfying the requirement ($\delta D \neq 0$ and/or $\delta R \neq 0$) as in Examples 1 to 13 of the present invention, occurrence of zero-order diffraction light (noise) can be suppressed in uniaxial linear diffusion light to improve the light distribution properties of diffusion light, and spectral noise can also be reduced to improve the homogeneity in the X direction of the diffusion light as well.

(B) As to Condition of Expression (2) (K≥14)

As shown in Table 1, Examples 1 to 6 satisfied the condition of Expression (1) (K≥9), but did not satisfy the condition of Expression (2) (K≥14). As a result, in Examples 1 to 6, the evaluation of light distribution properties and the evaluation of homogeneity were all evaluated as "B", and the overall evaluation was evaluated as "C".

In contrast to this, Examples 7 to 13 satisfied the condition of Expression (2) (K 14). As a result, in Examples 7 to 13, one of or both the light distribution properties and homogeneity was/were evaluated as "A", and the overall evaluation was evaluated as "A" or "B".

The above results reveal that by satisfying the condition of Expression (2) (K 14) as in Examples 7 to 13 of the present invention, occurrence of zero-order diffraction light (noise) can be suppressed more reliably to further improve the light distribution properties of diffusion light, and the spectral noise can be significantly reduced to further improve the homogeneity in the X direction of the diffusion light as well.

(C) As to Condition of Expression (3)(K<46.9) and Condition that "δEc≤30%"

As shown in Table 1, Reference Examples 1 and 2 did not satisfy the condition of Expression (3) (K<46.9). Expression (3) is an expression that represents the physical configuration condition of the microlens array according to the present embodiment. In addition, Reference Example 3 did not satisfy the condition that "δEc≤30%". This condition that "δEc≤30%" is also an expression that represents the physical configuration condition of the microlens array according to the present embodiment. Further, Reference Examples 1 and 2 did not satisfy the condition that "δD<30%" and "δR<30%" (a preferable condition as the physical configuration condition for the microlens array). As a result, in Reference Examples 1 to 3, the lens surface shapes were excessively varied, so that a plurality of cylindrical lenses did not fall within the lens generation region, and missing of the microlens structure occurred. Thus, the physical configuration condition for the microlens array was not satisfied. As a result, the overall evaluations of Reference Examples 1 to 3 were evaluated as "E".

In contrast to this, Examples 1 to 13 satisfied the condition of Expression (3) (K<46.9), and also satisfied the condition that "δEc≤30%". Further, Examples 1 to 13 also satisfied the preferable condition that "δD<30%" and "δR<30%". As a result, in Examples 1 to 13, a plurality of cylindrical lenses fell within the lens generation region, and missing of the microlens structure did not occur, so that the physical configuration condition for the microlens array was satisfied. As a result, the overall evaluations of Examples 1 to 13 were not evaluated as "E", but evaluated as "A" to "C".

The above results reveal that by satisfying the condition of Expression (3) (K<46.9) and the condition that "δEc≤30%" as in Examples 1 to 13 of the present invention, the surface shapes of the respective cylindrical lenses can be varied within an appropriate variation range, so that the physical configuration condition for the microlens array is satisfied. Further, it is also revealed that by satisfying the preferable condition that "δD<30%" and "δR<30%", the physical configuration condition for the microlens array is satisfied more reliably, and feasibility of the microlens array structure can be improved further.

A suitable embodiment of the present invention has been described above in detail with reference to the accompanying drawings, whilst the present invention is not limited to such an example. A person skilled in the art may obviously find various alterations and modifications within the scope of the appended claims, and it should be understood that they will also naturally come under the technical scope of the present invention.

REFERENCE SIGNS LIST 1 diffusion plate
3 unit cell
10 base material
20 microlens array
21 cylindrical lens (microlens)
22 vertex of cylindrical lens (lens vertex position)
23 central point of cylindrical lens (central position)
D aperture width
R radius of curvature
Ec off-center amount

The invention claimed is:

1. A diffusion plate of a microlens array type that emits straight diffusion light, comprising:
   a base material; and
   a plurality of cylindrical lenses arranged in an X direction on an X-Y plane on at least one of surfaces of the base material, and composed of elongated convex portions or elongated concave portions extending in a Y direction vertical to the X direction, wherein
   an aperture width D [μm] in the X direction of each of the cylindrical lenses is randomly varied within a variation range defined by a variation full width rate δD [%] using a reference aperture width Dk [μm] as a reference,
   a radius of curvature R [μm] of each of the cylindrical lenses is randomly varied within a variation range defined by a variation full width rate δR [%] using a reference radius of curvature Rk [μm] as a reference,
   an off-center amount Ec [μm] of each of the cylindrical lenses is randomly varied within a variation range defined by a variation full width rate δEc [%], and
   the δD [%], the δR [%], and the δEc [%] satisfy Expression (1) below, and at least either the SD [%] or the δR [%] is not 0 [%]:

[Math. 1]

$$\sqrt{(\delta D)^2+(\delta R)^2+(\delta Ec)^2} \geq 9 \tag{1}$$

where
   the variation full width rate δD [%] is a ratio of a variation full width ΔD [μm] to the reference aperture width Dk [μm] (δD=ΔD/Dk×100),
   the variation full width ΔD [μm] is a difference between an upper limit value $dD_{MAX}$ and a lower limit value $dD_{MIN}$ of a variation amount dD of the aperture width D ($\Delta D=dD_{MAX}-dD_{MIN}$),
   the variation full width rate δR [%] is a ratio of a variation full width ΔR to the reference radius of curvature Rk (δR=ΔR/Rk×100),
   the variation full width ΔR [μm] is a difference between an upper limit value $dR_{MAX}$ and a lower limit value $dR_{MIN}$ of a variation amount dR of the radius of curvature R ($\Delta R=dR_{MAX}-dR_{MIN}$),
   the off-center amount Ec is an offset amount in the X direction of a position of a vertex of each of the cylindrical lenses relative to a central position in the X direction of each of the cylindrical lenses,
   the variation full width rate δEc [%] is a ratio of a variation full width ΔEc to the reference aperture width Dk (δEc=ΔEc/Dk×100),
   the variation full width ΔEc [μm] is a difference between an upper limit value $Ec_{MAX}$ and a lower limit value $Ec_{MIN}$ of the off-center amount Ec ($\Delta Ec=Ec_{MAX}-Ec_{MIN}$), and
   wherein a planar shape of each of the cylindrical lenses is a rectangular strip shape.

2. The diffusion plate according to claim 1, wherein the δD [%], the δR [%], and the δEc [%] satisfy Expression (2) below:

[Math. 2]

$$\sqrt{(\delta D)^2+(\delta R)^2+(\delta EC)^2} \geq 14 \qquad (2).$$

3. The diffusion plate according to claim 1, wherein the δD [%], the δR [%], and the δEc [%] satisfy Expression (3) below:

[Math. 3]

$$\sqrt{(\delta D)^2+(\delta R)^2+(\delta Ec)^2} < 46.9 \qquad (3)$$

4. The diffusion plate according to claim 1, wherein the δD is more than or equal to 7% and less than 30%.

5. The diffusion plate according to claim 1, wherein the δR is more than or equal to 7% and less than 30%.

6. The diffusion plate according to claim 1, wherein the δEc is more than or equal to 7% and less than or equal to 30%.

7. A display device comprising the diffusion plate according to claim 1.

8. A projection device comprising the diffusion plate according to claim 1.

9. A lighting device comprising the diffusion plate according to claim 1.

10. A remote sensing light source comprising the diffusion plate according to claim 1.

* * * * *